United States Patent
Nagar et al.

(10) Patent No.: US 11,057,673 B2
(45) Date of Patent: Jul. 6, 2021

(54) PERSONALIZED CONTENT AGGREGATION AND DELIVERY

(71) Applicant: International Business Machines Corporation, Armonk, NY (US)

(72) Inventors: Raghuveer P. Nagar, Kota (IN); Reji Jose, Bangalore (IN); Anurag Srivastava, Pune (IN)

(73) Assignee: International Business Machines Corporation, Armonk, NY (US)

( * ) Notice: Subject to any disclaimer, the term of this patent is extended or adjusted under 35 U.S.C. 154(b) by 47 days.

(21) Appl. No.: 16/253,245

(22) Filed: Jan. 22, 2019

(65) Prior Publication Data

US 2020/0236427 A1 Jul. 23, 2020

(51) Int. Cl.
| | |
|---|---|
| H04N 21/414 | (2011.01) |
| H04N 21/442 | (2011.01) |
| H04N 21/25 | (2011.01) |
| H04N 21/262 | (2011.01) |
| H04N 21/81 | (2011.01) |
| G06Q 30/02 | (2012.01) |

(52) U.S. Cl.
CPC ... H04N 21/44218 (2013.01); H04N 21/2625 (2013.01); H04N 21/812 (2013.01)

(58) Field of Classification Search
CPC .......... G06Q 30/0265; G06Q 30/0266; H04N 21/812
See application file for complete search history.

(56) References Cited

U.S. PATENT DOCUMENTS

| | | |
|---|---|---|
| 2008/0147488 A1 | 6/2008 | Tunick |
| 2008/0215415 A1 | 9/2008 | Willms |
| 2010/0332315 A1 | 12/2010 | Kamar |
| (Continued) | | |

FOREIGN PATENT DOCUMENTS

WO 2016141075 A1 9/2016

OTHER PUBLICATIONS

Disclosed Anonymously, "Geo filtered billboard information fetch", An IP.com Prior Art Database Technical Disclosure, IP.com No. IPCOM000249324D, IP.com Electronic Publication Date: Feb. 16, 2017, 4 pages.

Primary Examiner — Hsiungfei Peng
Assistant Examiner — Fred Peng
(74) Attorney, Agent, or Firm — Christopher M. Pignato

(57) ABSTRACT

Systems, methods, apparatuses and computer program products leveraging an internet of things network integrated into a surrounding environment to detect a presence of users within engagement zones surrounding content displayed in a physical location. One or more IoT devices equipped with sensors, audio systems, video systems and/or user input capabilities record interactions with the displayed content, and capture behavioral cues indicating an expressed interest in the content by users. Digital versions of the displayed content are delivered to one or more devices associated with the user. Additional content associated with the displayed content or similar content having one or more of the same distinguishing characteristics may be aggregated with the digital versions of the displayed content and delivered to the user. Aggregated content delivery can be delayed until users are in a safe, suitable location to review the aggregated content being delivered.

17 Claims, 14 Drawing Sheets

(56) References Cited

U.S. PATENT DOCUMENTS

| | | | |
|---|---|---|---|
| 2013/0214688 A1* | 8/2013 | Chapman | G09F 13/04 |
| | | | 315/153 |
| 2016/0321401 A1* | 11/2016 | Buil | G16H 40/63 |
| 2017/0228788 A1* | 8/2017 | Rider | G06Q 30/0266 |
| 2018/0150871 A1 | 5/2018 | Adoni et al. | |

* cited by examiner

PERSONALIZED CONTENT AGGREGATION AND DELIVERY

TECHNICAL FIELD

The present disclosure relates generally to the field of internet of things networks, and more particularly to leveraging content distribution over a computer network comprising an internet of things.

BACKGROUND

The internet of things is a system of interrelated computing devices, mechanical or digital machines, objects, animals and/or people that are provided with unique identifiers (UIDs). IoT networks allow for the ability to transfer data over computer networks without requiring human-to-human or human-to-computer interaction. The device or object (i.e., the "thing") in the internet of things, can be a person with a heart monitor implant, animals with a microchip implant or transponder, home appliances, lightbulbs, an automobile with built in sensors and/or any natural or man-made object that can be assigned an IP address and can be capable of transferring data over a computer network.

An IoT ecosystem can comprise internet-enabled devices that use embedded processors and communication hardware to collect, send and act on data acquired from the IoT device's surrounding environment. IoT devices can share the data they collect by connecting to an IoT gateway or other edge device. The collected data can be sent to a cloud computing environment or analyzed by locally operating computer systems. IoT devices can communicate with one another or other related devices on the computer network. The connectivity, networking and communication protocols used, can allow for the IoT devices to interact without much, if any human interaction, and be used to monitor business processes, improve user experiences, enhance employee productivity, influence business decisions and integrate or adapt business models.

SUMMARY

A first embodiment of the present disclosure provides a computer-implemented method comprising the steps of: detecting a user entering an engagement zone of a physical location displaying content; recording behavioral data of the user while present within the engagement zone of the physical location displaying the content; analyzing behavioral data for behavioral cues expressing interest by the user in the content displayed at the physical location; determining, as a function of the behavioral data, that the user is expressing interest in the content; automatically searching for a digital version of the content displayed at the physical location and delivering the digital version of the content displayed at the physical location to a device operated by the user.

A second embodiment of the present disclosure provides a computer system comprising a processor; an internet of things (IoT) device placed in communication with the processor, wherein said IoT device includes an audio system, video system, sensor device or a combination thereof; and a computer-readable storage media coupled to the processor, wherein the computer readable storage media contains program instructions executing a computer-implemented method comprising the steps of: detecting a user entering an engagement zone of a physical location displaying content; recording behavioral data of the user while present within the engagement zone of the physical location displaying the content via the IoT device; analyzing behavioral data for behavioral cues expressing interest by the user in the content displayed at the physical location; determining, as a function of the behavioral data, that the user is expressing interest in the content; automatically searching for a digital version of the content displayed at the physical location and delivering the digital version of the content displayed at the physical location to a device operated by the user.

A third embodiment of the present disclosure provides a computer program product comprising: one or more computer readable storage media having computer-readable program instructions stored on the one or more computer readable storage media, said program instructions executes a computer-implemented method comprising the steps of: detecting a user entering an engagement zone of a physical location displaying content; recording behavioral data of the user while present within the engagement zone of the physical location displaying the content; analyzing behavioral data for behavioral cues expressing interest by the user in the content displayed at the physical location; determining, as a function of the behavioral data, that the user is expressing interest in the content; automatically searching for a digital version of the content displayed at the physical location and delivering the digital version of the content displayed at the physical location to a device operated by a user.

DETAILED DESCRIPTION

Overview

Figure 1:
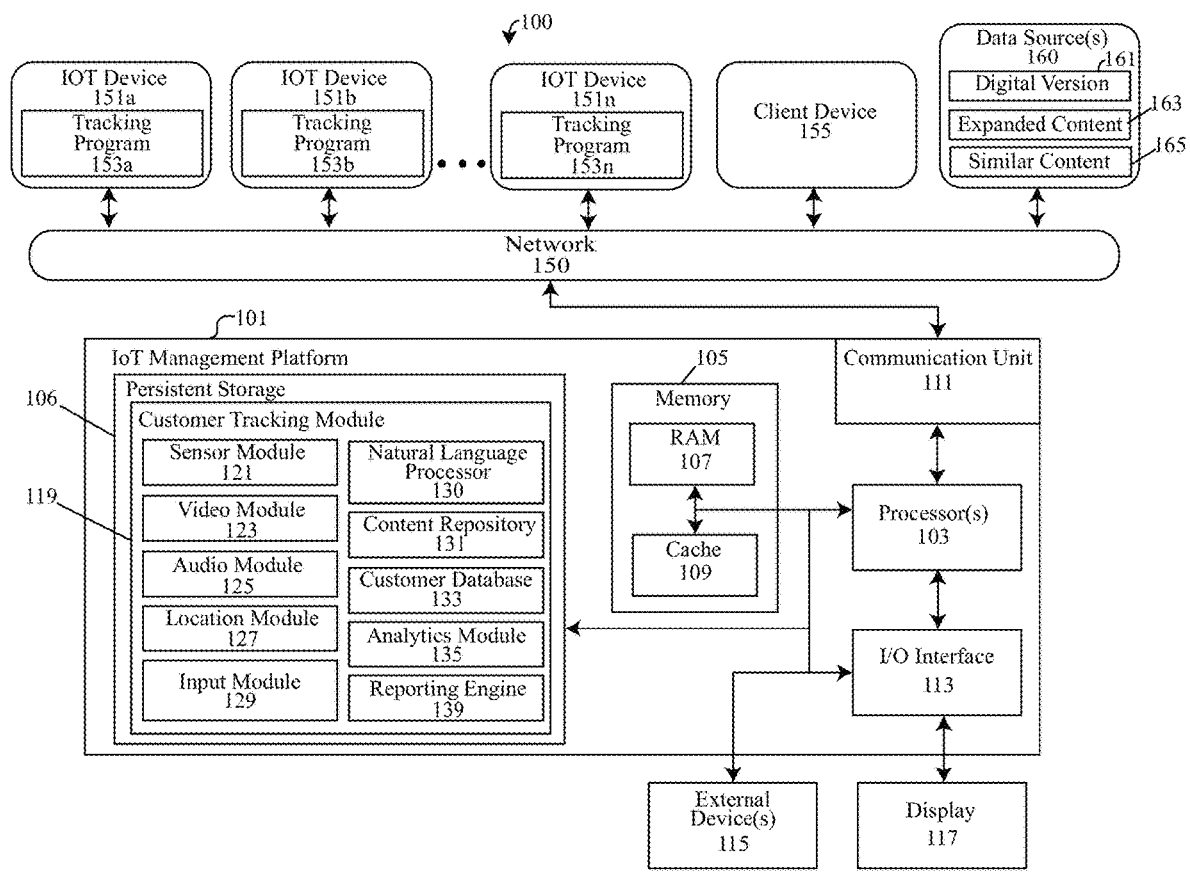
FIG. 1 depicts a functional block diagram describing an embodiment of a computing environment in accordance with the present disclosure.

The term "Internet of things" (abbreviated "IoT") may refer to an ever-growing network of physical objects and devices that may be equipped with electronic circuitry and hardware, allowing for the physical objects and devices to obtain IP addresses and achieve connectivity to the Internet or another type of computer network 150. IoT devices 151 connected to the Internet (or other computer networks 150) allow for communication to occur between IoT devices 151, the Internet, and other network enabled computing systems. An IoT device 151 may refer to physical objects that may be embedded with technology allowing for network 150 communication between IoT devices 151, computer systems, servers, gateways and the environments external to the IoT device 151. IoT devices 151 may be connectable to the Internet and may include properties, parameters and attributes that may be typical of a network enabled computer system, such as an assigned IP address or MAC address.

Embodiments of this disclosure describe apparatuses, systems, methods, and computer program products that leverage the use of IoT devices 151 and computing networks 150, integrated within the environment surrounding a user 601 or the content 603, to identify a user's 601 interest in content 603 being displayed at physical locations. Embodiments described herein, may detect the presence of a user 601, capture the user's 601 interaction with the displayed content 603 using one or more IoT devices 151, and identify behavioral cues that may indicate the user's 601 interest in the displayed content 603, such as the focus of the user's 601 eyes, eye movement, body language, physical gestures, vocalized comments and speech, voice inputs or changes in physiological measurements (i.e. vital measurements such as heart rate, blood pressure, oxygen levels, $CO_2$ levels, etc.). In some embodiments, user's 601 may be notified when data collection is being performed and user's 601 may opt-in or provide permission for such data collection to be performed. In other embodiments, users who receive notification's regarding data collection may choose to opt-out of the data collection.

Embodiments of the present disclosure that have identified a user 601, through the user's 601 behavioral cues, as having an interest in the displayed content 603, may retrieve a digital version 161 of the content 603 that was previously viewed in the physical location and deliver the digital version 161 of the content 603 to a device that is capable of being operated by or in the possession of the user 601. For example, a client device 155 or IoT device 151, such as a smartphone, tablet computer, laptop, smart watch, fitness band, wrist band, glasses, portable media player, or a computer system integrated into an automobile. Embodiments of the present disclosure may not only deliver a digital version 161 of the displayed content 603 but may additionally provide expanded content 163 that may be further available and supplement the displayed content 603. For example, the displayed content 603 may be an advertisement for an upcoming theatre production displayed on a billboard. In addition to a digitized version of the billboard being sent to a device associated with the user 601, an expanded set of materials can also be provided, including promotional videos, commercials, trailers, reviews, show schedule, ticket purchase locations, website links, etc. further describing the production.

Furthermore, in addition to the digital versions 161 of the displayed content 603 and the expanded content 163 being delivered to the user 601, in some embodiments "similar content" 165 to the displayed content 603 may be identified, retrieved and delivered to the user's 601 device. The displayed content 603 that the user 601 has expressed an interest in may be analyzed for one or more distinguishing characteristics. Based on the distinguishing characteristics, similar content 165 bearing one or more of the same distinguishing characteristics may be retrieved and delivered to the user's 601 device. A combination of the digital version 161 of the displayed content 603, the expanded content 163 and/or the similar content 165 may be delivered together to the user's device, the combination of which may be referred to herein as "aggregated content." Using the example of the theatre production advertisement mentioned above, the similar content 165 delivered to the user 601 could include promotional and marketing materials for other various plays, movies, television shows, books and projects sharing one or more distinguishing characteristics, for example, content having similar themes, written by the same author, produced by the same publisher or includes one or more of the same actors/actresses.

In some embodiments, the similar content 165 that may be retrieved and delivered to the user's 601 device may be competing variations of products or services that may be available to the user 601. For example, a user 601 may express interest in a physical display describing a particular internet service provider. Embodiments of the present disclosure may not only deliver a digital version 161 of the billboard to the user 601 (along with one or more sets of expanded content 163) but may also retrieve and deliver advertisements or product information about the internet service provider's nearest competitors as similar content 165. In some embodiments, the systems described in the present disclosure may perform a comparison between the products or services described by the displayed content 603, find one or more competitors offering similar content 165 having the same or similar product or service and deliver a report comparing and contrasting the products or services between the displayed content 603 via the digital version 161 and the similar content 165, to the user's 601 device. In some embodiments, the digital version 161, similar content 165 and/or expanded content 163 may include order forms, links to company websites, distributors or retailers. A user 601 may seamlessly order products and services being presented to the user, automatically apply any promotions, pricing or discounts being advertised by the displayed content 603 and arrange delivery of selected products or services to the user's address or location.

Embodiments of the present disclosure recognize that delivery of the digital version 161 of the content 603, sets of expanded content 163 and similar content 165, during a user's 601 travels may pose a distraction to the user 601 if the user 601 is in charge of operating a vehicle. In some embodiments, delivery of the aggregated content to the user's 601 device may be delayed until a future point in time, wherein delivery may be considered safe or appropriate. For example, a user 601 may be driving along a highway at a high rate of speed and view an advertisement, business, products being displayed, etc. While passing by, the user 601 may express one or more behavioral cues demonstrating interest in the content being viewed by the user. Embodiments of the present disclosure may track the user's 601 rate of movement using one or more sensor devices 201 embedded within one or more IoT devices 151 and/or use video monitoring to track a user's 601 current activities (i.e. driving a car while viewing a physical display). Embodiments of the present disclosure may determine, based on the speed of movement and collected video data, that the user 601 is still travelling within a moving vehicle and operating the vehicle as the driver. The embodiments of the present disclosure, may delay delivery of the aggregated content until one or more sensor devices 201 measuring the rate of movement/or collected video data indicate that the user 601 has parked the vehicle, is no longer the driver or the user 601 may be currently travelling by foot and therefore proceed with delivery to the user's 601 device.

System for Delivering Personalized, Aggregated Content

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Referring to the drawings, FIGS. 1-8*c* depict diagrams of a computing environment 100, 300, 450 and computing systems for tracking a user 601 expressing interest, based on behavioral cues, in content 603 displayed at physical locations through the use of one or more IoT devices 151. Based in the interests expressed by the user, digital versions 161 of the content 603, expanded content 163 and similar content 165 may be discovered and delivered a device owned or operated by the user 601, in accordance with the embodiments of the present disclosure. Embodiments of computing environment 100, 300, 450 may include a plurality of computer systems and devices interconnected via a computer network 150, such as an IoT management platform 101, a plurality of IoT devices 151*a*, 151*b* . . . 151*n* (hereinafter referred to generally as "IoT device 151"), one or more client devices 155 and/or one or more data sources 160 which may be maintained by a computer system or server. As shown in FIGS. 1-8*c*, the number of IoT devices 151, client devices 155 and data sources 160 may not be limited to the number depicted in the drawings. The number of IoT devices 151, client devices 155, data sources 160 or any other components or systems being represented by the drawings that may be duplicated, may be any number supported by network 150 and the computing environments 100, 300, 450. For example, the $n^{th}$ number of a repeated device, component, system, etc., such as the IoT device 151*n*, identifies the last component, device or system that is part of a set of duplicate systems, devices, or components described herein and not necessarily the second, third or fourth iteration in the repeating sequence of components, devices, systems, etc. shown in the drawings.

Figure 10:
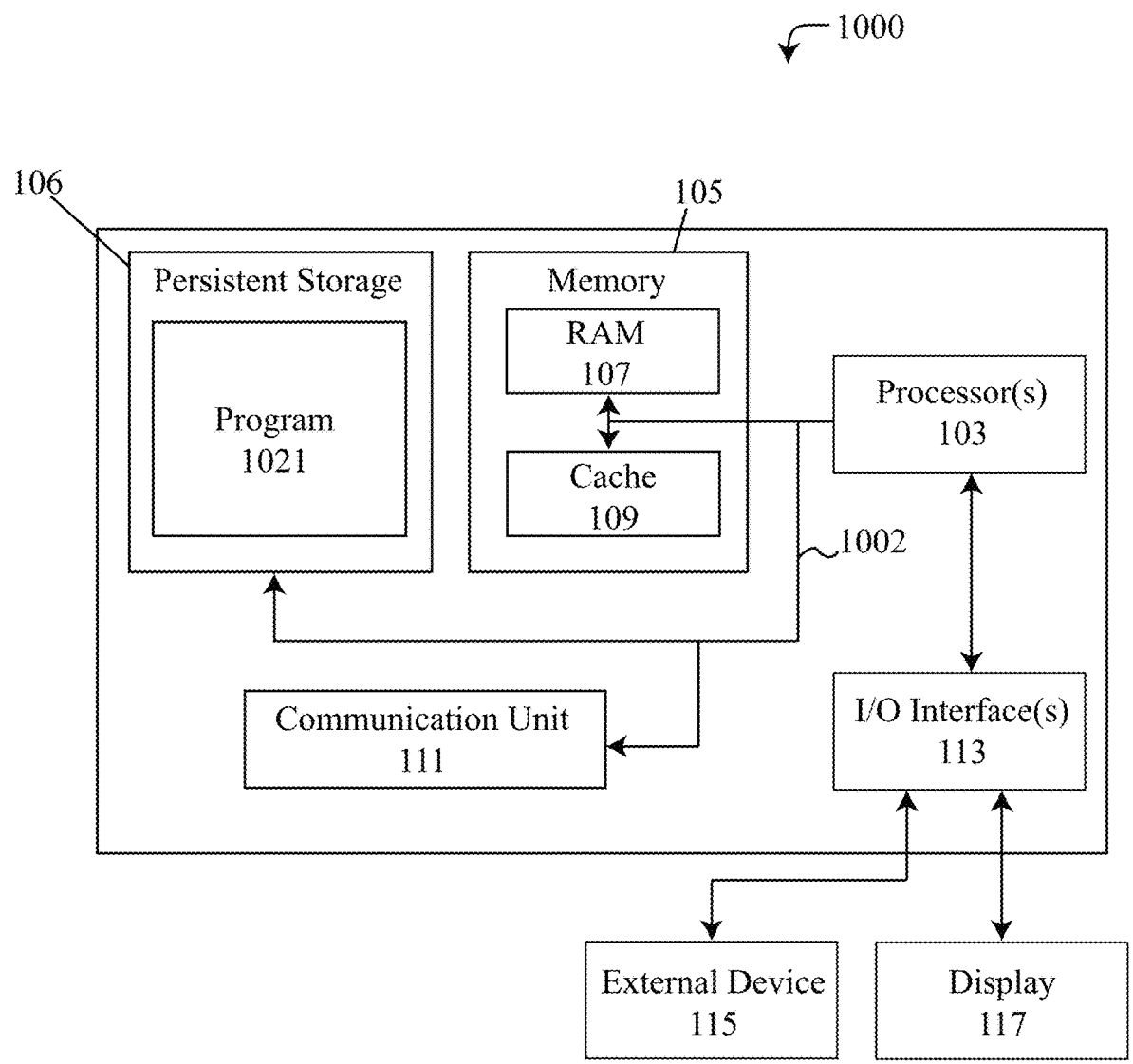
FIG. 10 depicts an embodiment of a block diagram of internal and external components of a computer system in accordance with the embodiments of the present disclosure.

Embodiments of the IoT management platform 101, IoT device 151, client device 155 and the computer system maintaining a data source 160, may each be a specialized computer system comprising specialized configurations of hardware, software or a combination thereof as shown and described in FIGS. 1-8*c* of the present disclosure and in embodiments described herein. Embodiments of the IoT management platform 101, IoT device 151, client device 155 and data source 160 may not only comprise the elements of the systems and devices depicted in FIGS. 1-8*c* but may also incorporate one or more elements of a computer system 1000, as shown in FIG. 10 and described in the COMPUTER SYSTEM section of this disclosure as detailed below. One or more elements of the computer system 1000 may be integrated into the specialized computer systems of computing environment 100, 300, 450, including the IoT management platform 101, IoT device 151, client device 155 and computing system maintaining data source 160.

Embodiments of the IoT management platform 101, client device 155, data source 160 and other network accessible systems may be desktop computers, laptop computers, tablet computers, smartphones, server computers, or any other computer system known in the art. IoT devices 151 may be any physical device or object embedded with electronics, circuitry, software, sensors 201, actuators, recording devices or recording systems (i.e. audio system 205, video system 203, sensor device 201) and/or connectivity hardware which may enable IoT devices 151 to connect to a computer network 150, collect data or exchange data. In some embodiments of the computing environments 100, 300, 450, IoT devices 151, IoT management platform 101, client devices 155, data sources 160 and other network accessible systems, may represent computer systems utilizing clustered computers and components to act as a single pool of seamless resources when accessed through network 150. For example, such embodiments may be used in data center, cloud computing, storage area network (SAN), and network attached storage (NAS) applications.

In certain embodiments, the IoT management platform 101, IoT device 151, client device 155, data source 160 and other network accessible systems may represent virtual machines provisioned by a host computer on the network 150. For example, IoT management platform 101 may host a plurality of virtual machines operating as IoT devices 151 or client devices 155. In some embodiments, an IoT device 151 may have embedded virtualization characteristics, allowing for the IoT device 151 to be provisioned with a management layer along with separate slots capable of being assigned one or more types of functionality provisioned thereto. An IoT management platform 101 that has virtualization capabilities, may be capable of being provisioned for a plurality of functions on the original hardware of the IoT device 151. For example, virtualized functionalities of an input device 207, audio system 205, video system 203 or sensor device 201 may be assigned to the IoT device 151. In general, IoT management platform 101, IoT device 151, client device 155, data source 160 and other network accessible systems may be representative of any electronic devices, or combination of electronic devices, capable of executing machine-readable program instructions, as described in greater detail with regard to FIG. 9*a*-9*b*.

Embodiments of the IoT device 151, IoT management platform 101, client device 155, data source 160 and other network accessible systems may each be connected and placed into communication with one another over a computer network 150. Embodiments of the computer network 150 may be constructed using wired, wireless or fiber optic connections. As shown in the exemplary embodiments, the IoT management platform 101, IoT device 151, client device 155, data source 160 and other network accessible systems, may connect and communicate over the network 150 using a communication unit 111, such as a network interface controller or other network communication hardware. Embodiments of the communication unit 111 may implement specialized electronic circuitry allowing for communication using a specific physical layer and a data link layer standard. For example, Ethernet, Fiber channel, Wi-Fi or Token Ring.

Communication unit 111 may further allow for a full network protocol stack, enabling communication over network 150 to the group of computer systems or other computing hardware devices linked together through communication channels. The network 150 may facilitate communication and resource sharing among the IoT management platform 101, IoT devices 151, client device 155, data source 160, and other network accessible systems connected to the network 150 (for example, network accessible storage media). Examples of network 150 may include a local area network (LAN), home area network (HAN), wide area network (WAN), back bone networks (BBN), peer to peer networks (P2P), campus networks, enterprise networks, the Internet, cloud computing networks and any other network known by a person skilled in the art.

Cloud computing networks are a model of service delivery for enabling convenient, on-demand network 150 access to a shared pool of configurable computing resources (e.g., networks, network bandwidth, servers, processing, memory, storage, applications, virtual machines, and services) that can be rapidly provisioned and released with minimal management effort or interaction with a provider of the service. A cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices 155 or IoT devices 151 through a thin client interface such as a web browser (e.g., web-based e-mail). The consumer does not manage or control the underlying cloud infrastructure including network 150, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks 150, servers, operating systems, or storage, but has control over the deployed applications and possibly application hosting environment configurations.

Infrastructure as a Service (IaaS): the capability provided to the consumer is to provision processing, storage, networks 150, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment 450 is service oriented with a focus on statelessness, low coupling, modularity, and semantic interoperability. At the heart of cloud computing is an infrastructure that includes a network 150 of interconnected nodes 410.

Figure 4:
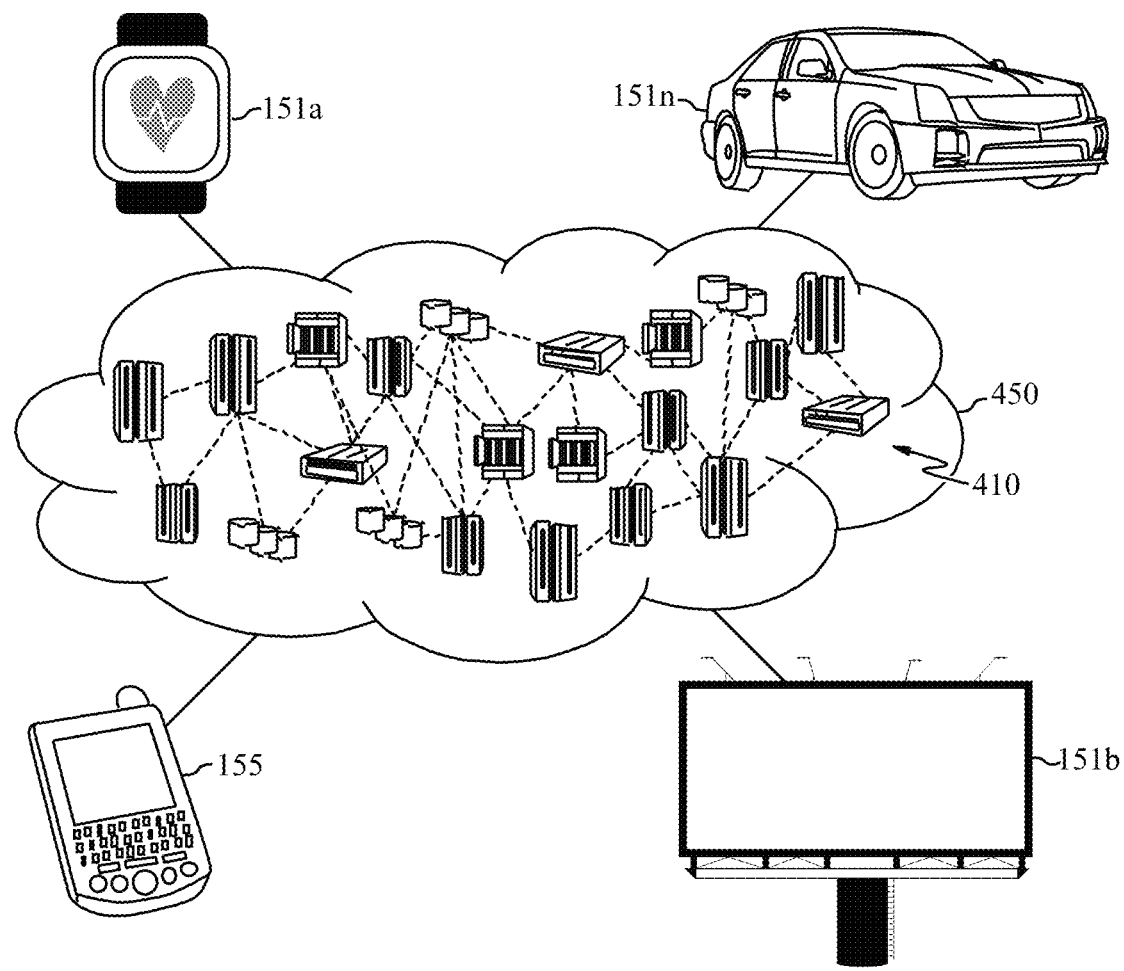
FIG. 4 depicts an embodiment of a cloud computing environment in accordance with the present disclosure.

Referring to the drawings, FIG. 4 is an illustrative example of a cloud computing environment 450. As shown, cloud computing environment 450 includes one or more cloud computing nodes 410 with which IoT devices 151 and client devices 155 can be used by cloud consumers. For example, a smartphone operating as a client device 155, a wearable monitoring device 151a, a network enabled advertisement display 151b, an automobile system 151n and/or any physical object equipped with a computing system or computerized components, that may communicate over a network 150. Nodes 410 may communicate with one another and may be grouped physically or virtually, in one or more networks 150, such as Private, Community, Public, or Hybrid clouds as described hereinabove, or a combination thereof. This allows cloud computing environments 450 to offer infrastructure, platforms and/or software as services for which a cloud consumer does not need to maintain resources on a local computing device. It is understood that the types of client devices 155 and IoT devices 151 connected cloud computing environment 450, are intended to be illustrative only. The computing nodes 410 and cloud computing environment 450 can communicate with any type of computerized device over any type of network 150 and/or network addressable connection (e.g., using a web browser).

Figure 5:
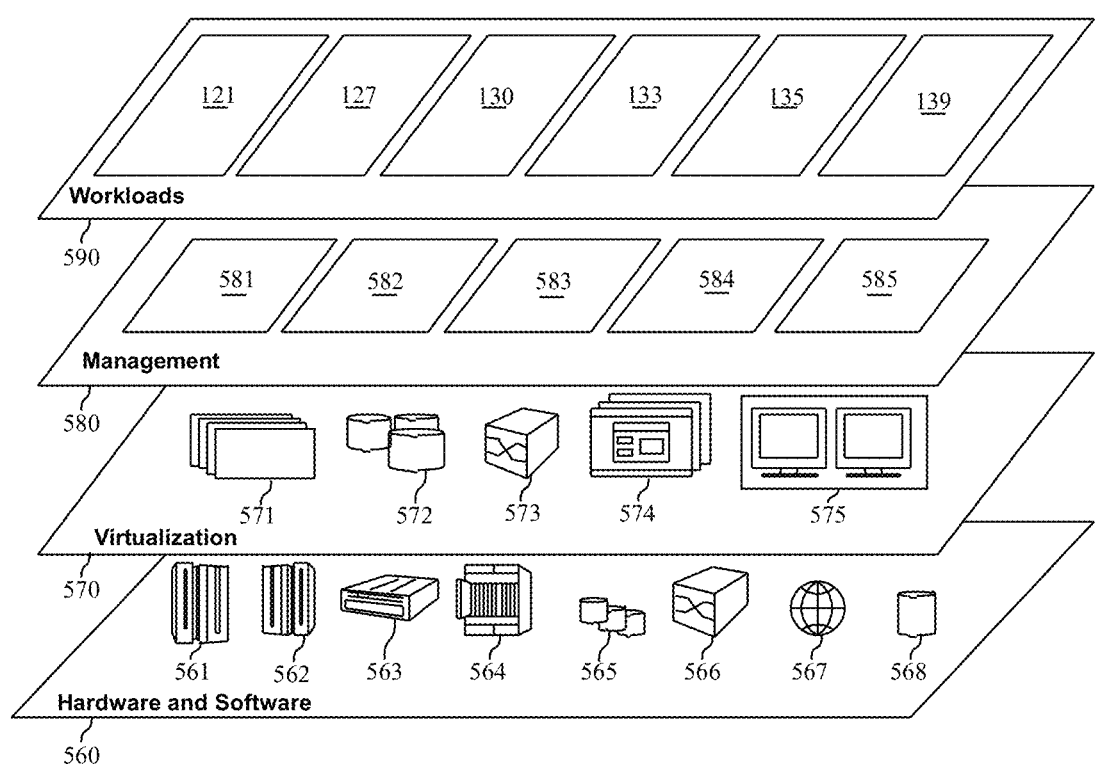
FIG. 5 depicts an embodiment of abstraction model layers of a cloud computing environment in accordance with the present disclosure.

Referring now to FIG. 5, a set of functional abstraction layers provided by cloud computing environment 450 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 560 includes hardware and software components. Examples of hardware components include: mainframes 561; RISC (Reduced Instruction Set Computer) architecture-based servers 562; servers 563; blade servers 564; storage devices 565; and networks and networking components 566. In some embodiments, software components include network application server software 567 and database software 568.

Virtualization layer 570 provides an abstraction layer from which the following examples of virtual entities may be provided: virtual servers 571; virtual storage 572; virtual networks 573, including virtual private networks; virtual applications and operating systems 574; and virtual clients 575.

In one example, management layer 580 may provide the functions described below. Resource provisioning 581 provides dynamic procurement of computing resources and other resources that are utilized to perform tasks within the cloud computing environment 450. Metering and pricing 582 provide cost tracking as resources are utilized within the cloud computing environment 450, and billing or invoicing for consumption of these resources. In one example, these resources can include application software licenses. Security provides identity verification for cloud consumers and tasks, as well as protection for data and other resources. User portal 583 provides access to the cloud computing environment 450 for consumers and system administrators. Service level management 584 provides cloud computing resource allocation and management such that required service levels are met. Service Level Agreement (SLA) planning and fulfillment 585 provide pre-arrangement for, and procurement of, cloud computing resources for which a future requirement is anticipated in accordance with an SLA.

Workloads layer 590 provides examples of functionality for which the cloud computing environment may be utilized. Examples of workloads and functions which may be provided from this layer include: sensor module 121, location module 127, natural language processor 130, user database 133, analytics module 135 and reporting engine 139.

Embodiments of the IoT management platform 101, IoT devices 151 and client device 155 may include one or more processes, services, engines and/or modules specializing in performing one or more specific tasks or functions associated with tracking a user 601, identifying behavioral cues indicating an expressed interest in the content 603, aggregating a digital version 161 of the viewed content 603, expanded content 163, and/or similar content 165 having similar distinguishable characteristics and delivering the aggregated content to the user 601. The term "module" may refer to a hardware module, software module, or a module may be a combination of hardware and software resources. A module (whether hardware, software or a combination thereof) may be designed to implement or execute one or more specific tasks, routines or functions. Embodiments of hardware-based modules may include self-contained components such as chipsets, specialized circuitry, one or more memory 105 devices and/or persistent storage 106 devices. A software-based module may be part of a program 1021, program code or linked to program code containing specific programmed instructions loaded into a memory 105 device or persistent storage 106 device of a computer system operating in computing environment 100, 300, 450.

Referring to the drawings, FIG. 1 depicts an embodiment of a computing environment 100 which may comprise an IoT management platform 101 connected to a network 150. Embodiments of an IoT management platform 101 may operate as a computing system, a centralized set of nodes 410 or may be part of a dispersed set of nodes 410 connected to the computing network 150. The IoT management platform 101 may perform one or more tasks, functions and routines associated with tracking user 601 interactions with one or more physical locations displaying content 603, observe behavioral cues, including physiological cues, that might suggest that the user 601 has expressed an interest in the content 603 being displayed, retrieving a digital version 161 of the physically displayed content 603 being observed by the user 601 and delivering the digital version 161 of the content 603 to an IoT device 151 or a client device 155 which may be accessible to the user 601.

In some embodiments, additional tasks or functions performed by the IoT management platform 101 may include characterizing the content 603 being observed by the user 601, to identify one or more distinguishing characteristics and retrieving similar content 165 that may share at least one of the distinguishing characteristics of the content 603. The IoT management platform 101 may aggregate the digital version 161 of the content 603, expanded content 163 and any similar content 165 (together referred to generally as "aggregated content") for delivery to the user 601. Embodiments of the IoT management platform 101, may manage the timing and/or location for delivering the aggregated content to a wearable IoT device 151 or client device 155 based on whether or not viewing the aggregated content could be performed by the user 601 in a safe manner or safe location. For example, delaying delivery of aggregated content while a user 601 is driving a vehicle, and delivering the aggregated content when the vehicle has stopped moving.

Embodiments of the IoT management platform 101 may be placed in communication with one or more IoT devices 151 via network 150 using wired and/or wireless connection means. For example, the IoT devices 151 can communicate over network 150 with the IoT platform 151 using one or more wired or wireless communication protocols, including IPv6, Ethernet, Zigbee, WIFI, Bluetooth, Bluetooth low energy, Z-Wave, RFID, near field communication (NFC), cellular, satellite or other wireless communication signals. In alternative embodiments, one or more IoT devices 151 may be directly connected to the IoT management platform 101 as an external device 115, via the input/output (I/O) interface 113. Embodiments of the IoT devices 151 can be any shape, size, or type of object equipped with network communication capabilities (such as a communication unit 111) and the ability to transfer data over network 150. Examples of IoT devices 151 can vary and may include objects such as smart TVs, displays 117, toys, speakers, mirrors, appliances, sensors, meters, wearable devices, security systems, air conditioners, thermostats, lighting systems, automobiles, or any other device outfitted with network communication capabilities.

Embodiments of each IoT device 151 may be further equipped with data collecting hardware and/or software, which may collect data about the user 601, the user's 601 surrounding environment, the environment surrounding the displayed content 603 and data inputted directly into the IoT device 151. As shown by the block diagram of the embodiment of the IoT device 151 depicted in FIG. 2, each IoT device 151 may be equipped with one or more data collecting systems, including one or more sensor devices 201, video systems 203, audio systems 205 and input devices 207. Embodiments of the sensor device 201 may refer to an apparatus that detects and responds to input from a physical environment. For example, a sensor device 201 can receive input in the form of light (including both visible and non-visible light), heat, motion, moisture, pressure, vibrations, sound waves, chemical reactions, or any other environmental phenomenon. Examples of the sensors that may be incorporated into a sensor device 201 can include an accelerometer sensor, proximity sensors, IR sensors, gas sensors, pressure sensors, temperature sensors, chemical sensors, motion detector sensors, optical sensors, level sensors, image sensors, gyroscope sensors and humidity sensors. As the input into the sensor changes over time, the sensor device 201 may output an electronic signal as a response to the environmental change. The output may be converted from an electrical signal to a human-readable display 117 of the IoT device 151 and/or may be transmitted electronically over network 150 for further processing, storage and analysis by the IoT management platform 101.

The type and purpose of the sensor data being generated by the sensor device 201 may vary based on the type of sensor device 201 being used and the IoT device 151 the sensor device 201 may be connected with. In some embodiments, the sensor device 201 may measure physiological changes in the user 601 by making contact with the user's 601 body. For example, an IoT device 151 can be a wearable device such as an IoT functional watch, bracelet, wristband, necklace, earrings, eye glasses, ring or other objects that may be worn by the user 601, as identified in the examples of FIG. 4, 6-8c as IoT device 151a. One or more of these objects operating as an IoT device 151 may make physical contact with the user 601 and collect health related information from the user 601 using one or more physical, chemical or biological sensors integrated into the sensor device 201 connected to the IoT device 151.

Embodiments of the IoT devices 151 connected to sensor devices 201 may be capable of collecting sensor data by measuring one or more changes to a user's 601 vitals or biometric information and outputting the changes in the user's 601 vitals as an electric signal. For example, measurements of a user's 601 heart rate, pulse, blood pressure, body temperature, oxygen levels, $CO_2$ levels, etc. The measurements of a user's 601 vitals and biometric information can be collected and transmitted over network 150 to the IoT management platform 101 periodically, at regular intervals or via a continuous data stream. An increase or decrease in the output of the sensor device 201 may be an indication of a behavioral cue, which may be interpreted as the user 601 expressing interest in the displayed content 603. For example, a rapid increase in heart rate can be indicative of excitation in the user 601 upon viewing the content 603. However, in some instances, a change to one or more physiological measurements of the user's 601 vitals alone may not always indicate an expression of interest. Rather, physiological measurements collected by sensor devices 201 may be analyzed alongside additional evidence of behavioral cues, including audio data, video data, input data, and additional sensor data to form a more complete picture of the user's 601 expressed interest in the content 603.

Figure 6:
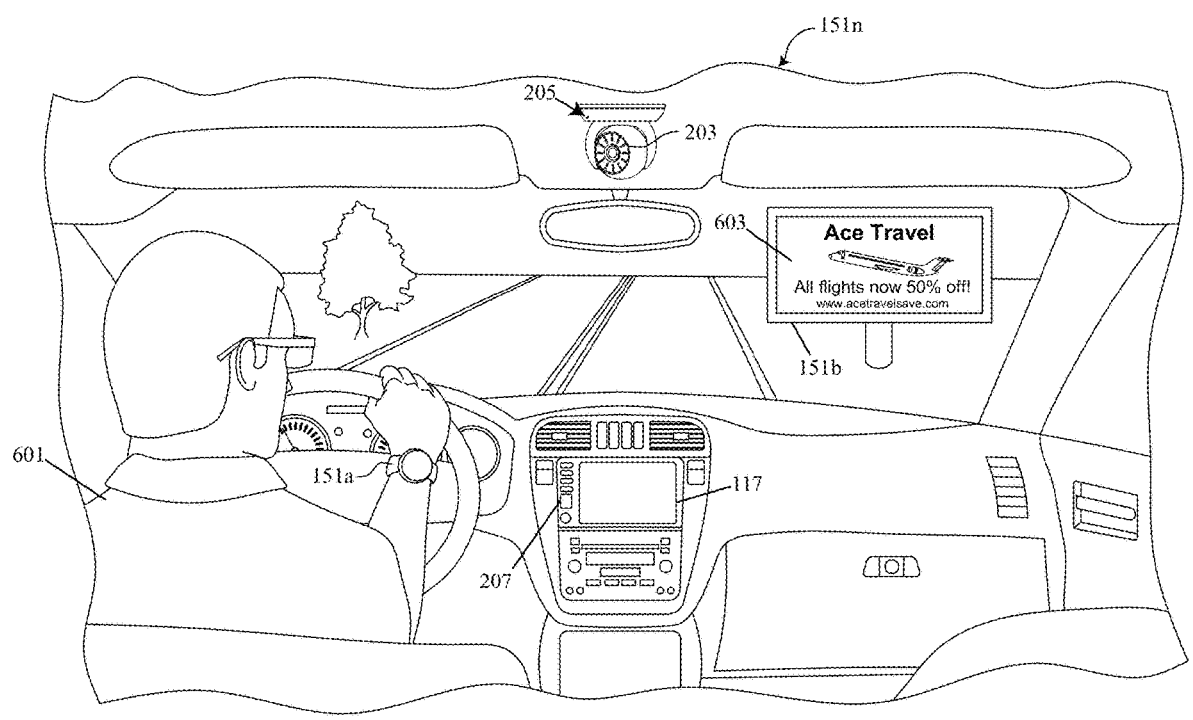
FIG. 6 illustrates an exemplary embodiment for tracking a user expressing interest in displayed content using one or more IoT devices in accordance the present disclosure.
Figure 7A:
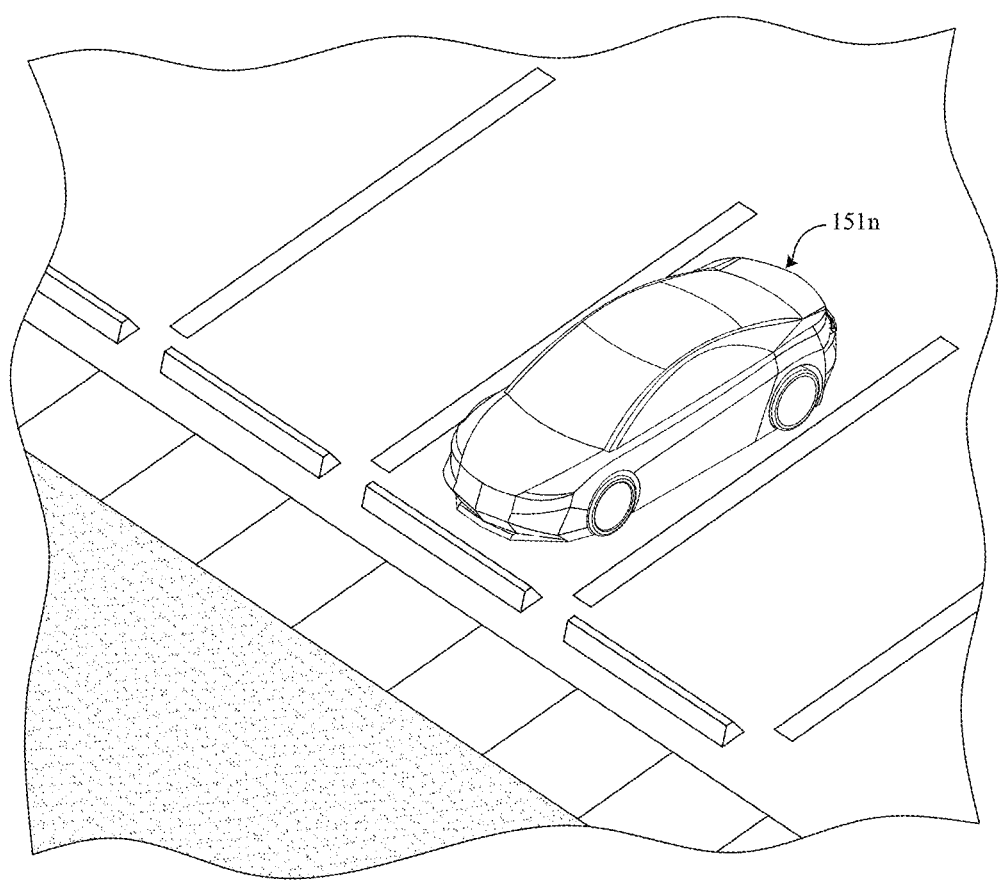
FIG. 7a illustrates an exemplary embodiment of establishing a safe environment for receiving delivery of aggregated content as described by the present disclosure.
Figure 7B:
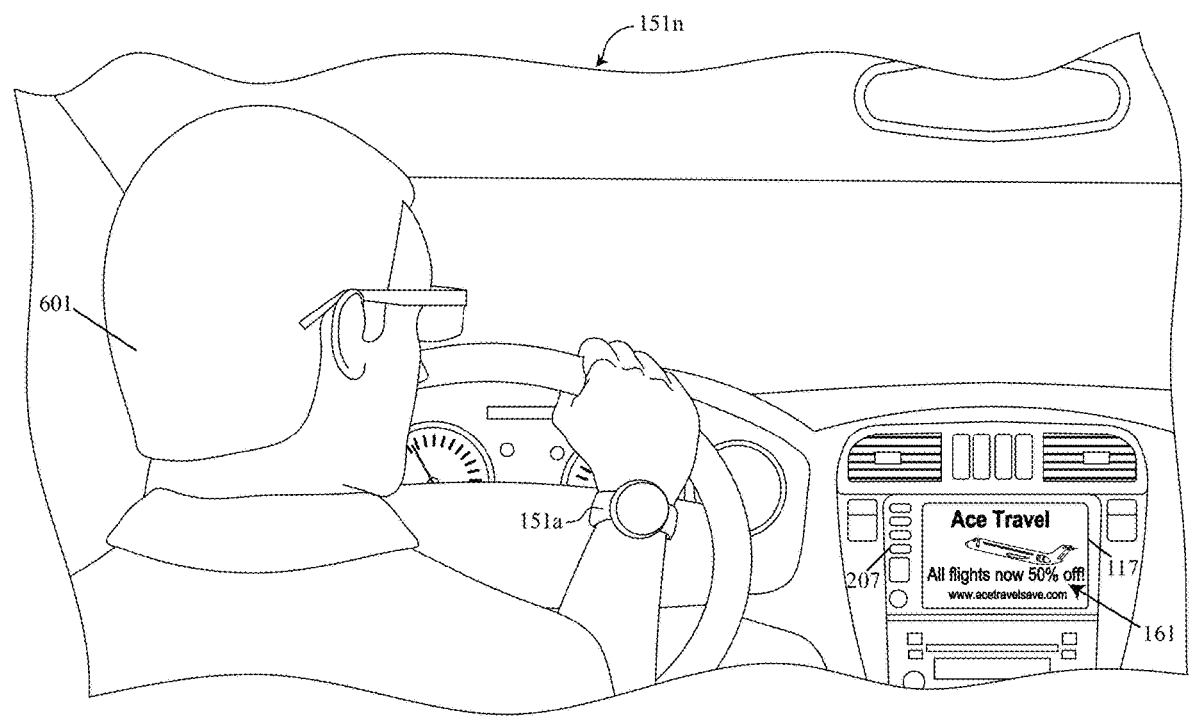
FIG. 7b illustrates an exemplary embodiment of displaying a digital version of the content on an IoT device, during safe conditions.

Embodiments of sensor data collected by one or more sensor devices 201 of an IoT device 151 may also be integrated into the environment surrounding the user 601 and/or the environment surrounding the content 603 being displayed, in order to monitor the behavior of each user 601 observing or interacting with the displayed content 603. For example, one or more IoT devices 151 may be embedded into a vehicle transporting the user 601, such as personal automobiles, trains, planes, buses, subway cars, etc., as shown by the embodiments of FIG. 6-7b. IoT devices 151 monitoring the surrounding environment may collect sensor data such as acceleration, speed, tilt, angular velocity, and may measure the proximity of the user 601 to the physical location displaying the content 603.

One or more IoT devices 151 monitoring a user 601, the environment surrounding the user 601, or the environment surrounding the content 603 being displayed, may further be equipped with a video system 203. The video system 203 may perform the function of observing and tracking the movements and behavior of a user 601 who may be viewing or interacting with the displayed content 603. The video system 203 may be described as any system that may be capable of recording, copying, broadcasting or displaying video or other moving visual media. A video system may be capable of capturing images and/or videos, which may be compressed, stored and transmitted over network 150. Embodiments of the video system 203 may be a digital video system or an analog video system in some instances. Embodiments of the video system 203 may record video data using one or more video input devices of the video system 203. In the exemplary embodiment of the video system 203, the video data may be recorded using a camera or camcorder connected to the video system 203. The recorded images and video captured by the video system 203 may be saved to memory 105 or persistent storage 106 of the IoT device 151 as video data in some embodiments. The video data recorded by the video system 203 may be further transmitted over network 150 to an IoT management platform 101 for further analysis and processing of the video data.

Embodiments of the IoT device 151 may comprise an audio system 205. The audio system 205 may be described as any system that may be capable of recording or reproducing sound. The audio system 205 may record sounds using an audio input device, such as a microphone to collect sound data. Embodiments of the audio system 205 may be a standalone system capable of recording and reproducing audio data collected by the microphone or other audio input device in some embodiments. In some alternative embodiments, the audio system 205 and the video system 203 may be a combined system comprising both the audio system 205 and video system 203, capable of recording both audio and video within the same system. The audio data recorded by the audio system 205 may be stored by the IoT device 151. In other embodiments, the recorded audio data may be transmitted via network 150 to the IoT management platform 101 for further processing and/or analysis.

Similar to the video data, audio data may provide evidence of a user's 601 expressed interest in the content 603 being displayed. The recorded audio data may be in the form of a user's 601 comments, voice commands, sentiment or offer other insights into the perception and interest of the user 601 as the user 601 views the content 603. For example, the audio system can record a user's 601 comments expressing interest or satisfaction while viewing content 603. These comments may be identified as providing a positive or negative sentiment to the viewing of the content 603. For example, a user 601 may express an exclamation such as "wow, that's neat" or "look at that advertisement", in some instances. In other instances, the user's 601 recorded audio data may provide commentary about what the user 601 has viewed, such as "I have to remember to look that up" or "I wonder where I can find out more information" about the content 603. In other instances, the user 601 may speak directly to the audio system 205 to express interest, by issuing a voice command. For example, the user 601 may suggest to the IoT device 151, "please find more" about the content 603 being displayed or "bookmark" information about the content 603.

In some embodiments, the audio data recorded by the audio system 205 may be cross referenced with the video data recorded by the video system 203 in order to provide a more complete understanding about the content 603 the user 601 is viewing at the time the audio data is recorded and the sentiment of the user 601 while viewing the content 603. For example, a user 601 entering a voice command suggesting to "bookmark" more information about the content 603 being displayed on an advertisement physically displayed along a highway, may not provide enough context for the IoT device 151 or the IoT management platform 101 to understand which content 603 the user 601 is referring to. However, embodiments of the video system 203 may track which content 603 the user 601 was visually observing at the time the audio data was recorded, providing a more complete understanding and context to the voice commands recorded, and any additional comments the user 601 may have expressed during the recording of the audio data.

Embodiments of an IoT device 151 may include one or more input devices 207 connected to the IoT device 151. An input device 207 may be a hardware or peripheral device that may send input data to the IoT device 151. The input device 207 may allow for a user 601 to communicate with and feed actions or commands to the IoT device 151. Input device 207 may transform actions or commands from the user 601 into electric signals that may be understood by the IoT device 151, IoT management platform 101 or other computer systems operating within the computing environment 100, 300, 450. Examples of input devices 207 can include keyboards, touch screen displays, pointing devices such as a mouse, stylus or touchpad, etc. Similar to the voice commands that may be inputted into the IoT device 151 via the audio system, input devices 207 may allow for a user to directly provide evidence of interest and feedback regarding one or more observed displays of content 603 at a physical location. For example, a user 601 can directly indicate to an IoT device 151 an interest in the content 603 by inputting an action or command directly instructing the IoT device 151 or IoT management platform 101 to send a digital version 161 of the content, expanded content 163 or similar content 165 to the user's 601 IoT device 151 or client device 155. In another example, the user 601 can rate the content 603 using an input device 207, provide positive or negative feedback, comment, bookmark, conduct a query to find more information (i.e. through a search engine or search service), or access more information about the content 603 directly, such as by visiting the content providers web page directly via a web browser or other application accessible via the IoT device 151, client device 155 or IoT management platform 101.

Embodiments of each IoT device 151 may be equipped with one or more software applications, modules, programs 1021 or services loaded into the memory 105 or persistent storage 106 of the IoT device 151. As demonstrated by the exemplary embodiments of the block diagrams depicted in FIGS. 1-2, each IoT device 151a, 151b . . . 151n may be comprise a tracking program 153a, 153b . . . 153n (hereinafter referred to generally as "tracking program 153") loaded into the memory 105 or persistent storage 106. The tracking program 153 loaded into the IoT device 151 may perform a plurality of tasks or functions associated with the collection of data from the sensor devices 201, video system 203, audio system 205 and/or input device 207 connected to or communicating with the IoT device 151. The tracking program 153 may save, store and update one or more profiles 233 of users 601 being tracked by the IoT device 151, configuration settings of the IoT device 151, track and report the location of the IoT device 151, facilitate communication between the IoT device 151 and the IoT management platform 101, deliver data collected by the IoT device 151 to the IoT management platform 101 and display aggregated content to the user 601 (i.e. via human-readable display 117) of the IoT device 151.

Figure 2:
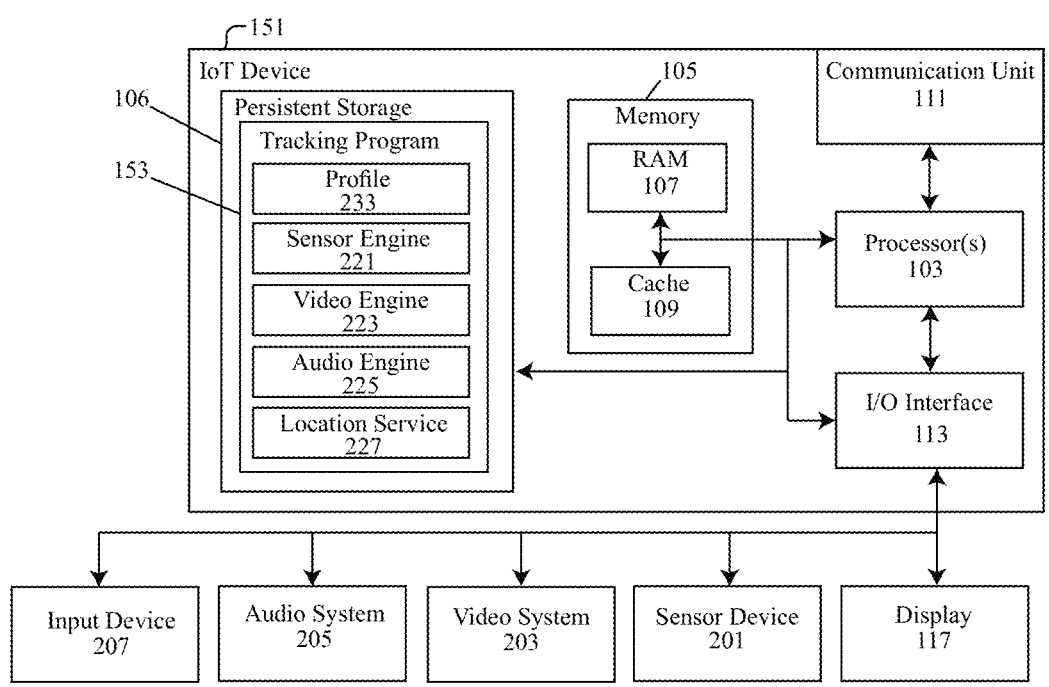
FIG. 2 depicts a functional block diagram describing an embodiment of an IoT device in accordance with the present disclosure.
Figure 3:
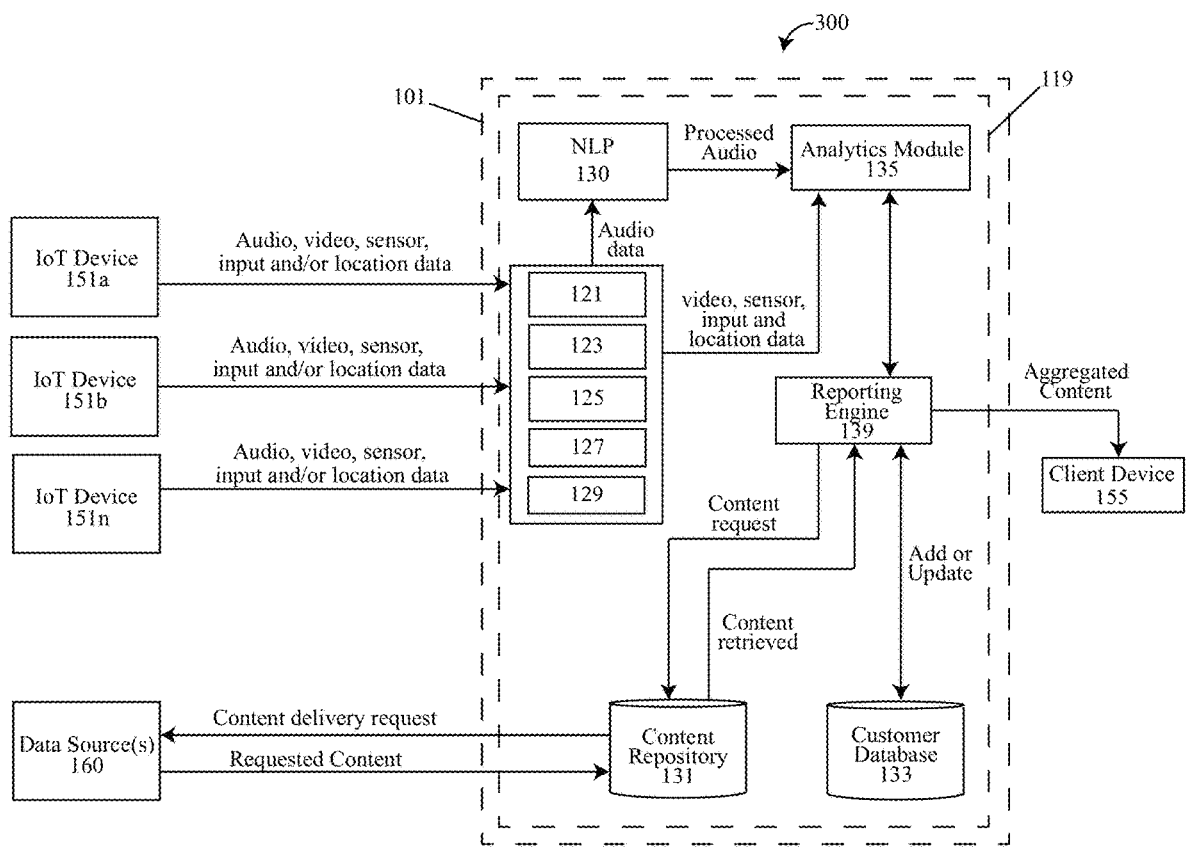
FIG. 3 depicts a workflow diagram of a computing environment comprising one or more IoT devices consistent with the present disclosure.

As shown by the embodiment of the IoT device 151 in FIG. 2, the tracking program 153 may include one or more modules, engines and/or services for executing the tasks or functions of the IoT device 151. As shown in the embodiment of the tracking program 153, the tracking program 153 may include a profile 233, sensor engine 221, video engine 223, audio engine 225 and location service 227. Embodiments of the profile 233 may save and store configuration settings of the IoT device 151 in some instances. In other embodiments, the profile 233 may be configured to store customized information and settings for each user 601 that may use or interact with each IoT device 151. Different profiles 233 stored by the IoT device 151 may be loaded when the users 601 interacting with the IoT device 151 changes. For example, the IoT device 151 can be an automobile being operated by a first user 601. When the first user 601 enters or engages the automobile, a first profile 233 may be loaded by the IoT device 151. For instance, by signing into the IoT device 151 using login credentials or providing biometric identification such as a fingerprint, retina scan, iris scan, voice imprint, facial recognition etc. Once a first user has been authenticated to the IoT device 151, the first user's profile 233, along with the associated settings, can be loaded as profile 233. Likewise, if a second user 601 enters the vehicle, a new profile 233 corresponding to the second user 601 may be successfully authenticated and accessed by the second user 601 operating the vehicle.

Embodiments of tracking program 153 may include a sensor engine 221. The sensor engine 221 may provide program instructions to each of the sensor devices 201 connected to the IoT device 151. Embodiments of the sensor engine 221 may control the functions of the sensor devices 201, including the collection and storage of the sensor data, and, in some embodiments, the sensor engine may facilitate the transformation of the electrical signal output from the sensor device 201 into human-readable sensor data. Moreover, the sensor engine 221 may coordinate the localized storage of the sensor data within the memory 105 or persistent storage 106 of the IoT device 151 as well as the transmission of the sensor data from the IoT device 151 to the sensor module 121 of the IoT management platform 101.

In some embodiments of the IoT device 151, the tracking program 153 may comprise a video engine 223. The video engine 223 may perform the functions or tasks of controlling the video system 203, processing collected video data, storing the collected video data to the memory or persistent storage 106 of the IoT device 151 and transmitting the collected video data to the video module 123 of the IoT management platform 101. Embodiments of the video engine 223 may further control the positioning and focus of one or more components (such as a camera) of the video system 223 on the behavior cues of one or more users 601 as the users 601 enter the engagement zone of the displayed content 603.

In some embodiments, the software of the video engine 223 may provide the biometric capabilities to the video system 203 for both the identification of behavioral cues of the user 601 associated with an expression of interest in the content 603, as well as one or more biometric techniques for identifying the user 601. For example, the software of the video engine 223 can provide program instructions or algorithms for recording video data describing a user's 601 behavior cues and interaction with the content 603, including facial pattern recognition, identifying eye gaze, eye movements, the user's 601 attention, body language, gait, positive or negative gestures, and measuring distance between the user 601 and content 603.

Embodiments of the IoT device 151 may comprise a tracking program 153 equipped with an audio engine 225. The audio engine 225 may perform the tasks or functions associated with the recordation and/or reproduction of audio data recorded by the audio system 205. The audio engine 225 may control the recording position, directionality of microphones, the sound levels of the audio data, provide an interface or presentation of the audio data for editing or modification, parse audio data for voice commands, interpret voice commands in the recorded audio data and/or convert the voice commands into program instructions. Embodiments of the audio engine 225 may include a natural language processor 130 (NLP 130) integrated into the tracking program to perform one or more functions of the NLP 130 as described below, prior to transmission of the audio data to the audio module 125 of the IoT management platform 101. Embodiments of the audio engine 225 may store the recorded audio data and/or processed audio from the NLP 130 in the memory 105 or persistent storage 106 of the IoT 151. The audio engine 225 may transmit audio data that has been recorded by the audio system 205 and/or processed by an NLP 130 to the audio module 125 of the IoT management platform 101.

In some embodiments of the IoT device 151, the tracking program 153 may further comprise a location service 227. The location service 227 may collect and store location data describing the position or location of the IoT device 151. For example, the location service may collect global positioning system (GPS) data from a GPS receiver or antenna connected to the IoT device 151. The location service 227 may map the location of the IoT device 151 relative to the physical location of one or more displays of content 603. In some embodiments, the location service 227 may point the user 601 via the IoT device 151 or client device 155, to the nearest physical location displaying content 603 that may be registered with the IoT device 151 or the IoT management platform 101. Embodiments of the location service 227 may transmit the location data of the IoT device 151 to the location module 127 of the IoT management platform 101.

Embodiments of the IoT management platform 101 may be equipped with its own program, software and/or application for implementing one or more functions of the IoT management platform 101. In the exemplary embodiment shown in FIG. 1, the IoT management platform may be equipped with a user tracking module 119, capable of performing each of the tasks, functions and routines associated with managing one or more IoT devices 151, tracking users' 601 behavioral cues and delivering a digital version 161 of the content 603 as a function of the user's 601 expressed interest in the content 603 to one or more of the user's 601 devices. Embodiments of the user tracking module 119 may comprise one or more sub modules, engines, or programs, which may be dedicated to performing one or more individual tasks, routines or functions described herein. As shown in the example of FIG. 1, the user tracking module 119 may include a sensor module 121, video module 123, audio module 125, location module 127, input module 129, natural language processor 130, content repository 131, user database 135, analytics module 135 and/or reporting engine 139.

Embodiments of the sensor module 121 may perform the task or function of receiving, storing and processing sensor data collected and transmitted to the IoT management platform 101 from one or more sensor devices 201. Each sensor device 201 may be connected to or form part of one or more IoT devices 151. Embodiments of the sensor module 121 may organize, format and store the sensor data being received. For example, the sensor data received by the sensor module 121 can be organized and formatted into database which may include a plurality of fields describing the sensor data and the origins of the sensor data. Inputting information describing the sensor data into the fields may allow for increased searchability and analysis of the sensor data by users or administrators of the IoT management platform 101. The organizational fields describing the sensor data may describe which IoT device 151 is collecting the sensor data, the types of sensor data being collected, the date, time and location of the data collection and an identifying description of the content 603 being viewed during the collection of the sensor data. Each of the measurements may be stored, organized, formatted and analyzed by the sensor module 121 for changes and variations over time. Changes in the user 601, including changes in physiological cues being collected by a wearable IoT device 151*a* monitoring user vitals, may be monitored and analyzed along with data collected by additional sensors, sensor types, audio data or video data collection systems to confirm or refute evidence of interest in the content 603 being observed by the user 601.

Embodiments of sensor data collected by one or more sensor devices 201 of an IoT device 151 may be integrated into the surrounding environment of the user 601 and/or the environment surrounding the content 603 being displayed, in order to monitor the behavior of each user 601 observing or interacting with the displayed content 603, as described above. Sensor data collected from the environment surrounding the user 601, may be sent to the sensor module 121 for further processing and analysis in view of other data being transmitted to the IoT management platform 101 as described herein and/or further analysis by one or more components of the IoT management platform 101. Sensor data describing the surrounding environment of the user 601 may be useful for identifying not only the user's 601 position relative to the displayed content 603 and/or interest in the displayed content 603, but also whether or not the user 601 is currently travelling in a manner that would be considered unsafe to deliver one or more pieces of aggregated content to a device 151, 155 at the current time. Delivery of the aggregated content may be delayed until a safe time or location to do so. For example, by delaying delivery of aggregated content until one or more measurements of sensor data collected by sensor devices 201 indicate the user 601 has stopped travelling at a rate of speed consistent with a motorized vehicle, as shown by the example of FIG. 7a-7b.

Embodiments of the user tracking module 119 may further comprise a video module 123. The video module 123 may perform the function or task of storing, maintaining, organizing and retrieving video data collected by one or more of the video systems 203 integrated into IoT devices 151. In some embodiments of the video module 123, the video data may be categorized and labelled based on the user 601 being observed in the video data, the location where the video data is collected, and the behavioral cues being observed within the video data. The video module 123 may allow for one or more searchable fields to be entered with information describing the collected video data, including the behavioral cues observed by one or more video systems 203.

Video data stored by the video module 123 may be analyzed by the analytics module 135 to determine the presence of visual cues that may indicate an expression of interest in displayed content 603 by the user 601, such as head movement, head position, eye focus, gaze, eye movements, changes in body language, gestures, etc. Video data may be tagged with keywords or metatags to increase searchability of the video data during subsequent review, analysis, analytics processing and report generation. The tagged video data organized by the video module 123 may be subsequently used, not only for identifying behavioral cues indicating expression of interest by a user 601, but also as training data to further improve the identification of behavioral cues during analysis by the analytics module 135, by comparing newly collected video data with previously collected and tagged video data.

Embodiments of the user tracking module 119 may include an audio module 125, Embodiments of the audio module 125 may perform the task or function of receiving, storing, processing and organizing audio data collected by one or more IoT devices 151. IoT devices 151 may be equipped with an audio system 205. The audio system 205 may record audio data that may be captured by a microphone or other audio input device. Audio data being captured may include vocal commands, comments, and vocalized impressions made by the user 601 while viewing the content 603.

In some embodiments, the audio module 125 may include a built in natural language processor 130, while in alternative embodiments, the natural language processor ("NLP") 130 may be a separate component of the user tracking module 119. The software of NLP 130 may perform the function or task associated with understanding human language being recorded as audio data stored by the audio module 125. Embodiments of NLP 130 can be used to interpret the audio data into free text and make the text analyzable. Moreover, embodiments of NLP 130 can perform sentiment analysis on the audio data in order to identify the mood or underlying tone of the user 601 when the audio data was collected. For example, the inflections and positive tone in the vocal pattern of the user 601 commenting on the displayed content 603 as being "really interesting", "innovative", "impressive", etc., may be identified as a positive behavioral cue providing evidence of interest by the user 601 in the content 603 being displayed.

Analyzing the audio data collected by audio system 205 and stored by audio module 125, using NLP 130, may be performed using deep learning models, rules-based systems, machine learning algorithms or other artificial intelligence (AI) techniques. The NLP 130 may examine patterns in the audio data in order to improve the user tracking module's 119 understanding of human language. The deep learning model may improve understanding of the human language by ingesting large amounts of labelled training data and identify relevant correlations between the training data and subsequent audio data being received. The NLP 130 may operate by breaking down language into shorter, elemental pieces, for example using parsing techniques, part-of-speech-tagging, language detection and the identification of semantic relationships. In some embodiments, the NLP 130 may be equipped with higher-level functionalities to analyze the audio data for one or more behavioral cues. Such higher level functionalities may include content categorization (linguistic-based summary, search and indexing), topic discovery and modeling (meanings, themes and forecasting), contextual extraction (pulling structured information from text-based sources), speech to text conversion (transform voice commands to text), text to speech conversion (transform written commands to text), and machine translation (automatic translation of text or speech to another language).

Embodiments of the IoT management platform 101 may include a location module 127. The location module 127 may perform the task or function of receiving and storing location data from the location service 227 of each IoT device 151 or client device 155, tracking or mapping the location of IoT devices 151, client device 155 and the user 601 relative to the physical location of the content 603 being displayed. Location data may refer to any data processed that may indicate geographical position, including latitude, longitude, altitude, direction of travel and/or the time the location data was recorded.

In some embodiments, the owners of the content 603 being displayed in a physical location may register the physical location of the content 603 and a description of the content 603 with the location module 127 of the IoT management platform 101. In some embodiments, the physical location of the content 603 being displayed may be submitted to the IoT management platform 101 and registered with the location module 127 by a third-party contributor or users 601 who may have interacted with the content 603 previously. Locations of registered content 603 may be mapped by the location module 127. The locations of IoT devices 151, client devices 155 monitoring the user 601 may report the location of the user 601 as the user 601 travels along a route. Embodiments of the location module 127 may compare location data from each IoT device 151 and client device 155, reporting location data relative to the one or more registered physical locations displaying content 603 in order to determine whether or not users 601 may be interacting with the displayed content 603 and to identify which specific content 603 being displayed, a user 601 is most likely interacting with based on the proximity of location to the registered content 603 displays.

In some embodiments, an engagement zone may be established by the location module 127. An "engagement zone" may refer to a space or location within the proximity of the content 603 being displayed, wherein the content 603 may be visible to, viewable by, or interactable with a user 601. In some embodiments, the location module 127 may track the users 601 entering the engagement zone of the content 603 by establishing a geofence having a virtual boundary surrounding each of the content 603 displays. As a user 601 registered to the IoT management platform 101 enters the geofence, one or more multiple IoT devices 151 monitoring the user 601, the user's 601 surroundings and/or the content 603 being displayed, may focus on the user 601, record or continue recording behavioral cues depicted by sensor data, video data, audio data and/or input data (individually or collectively may be referred to as "behavioral data"), and transmit the collected behavioral data to the IoT management platform 101 for analysis of the visible, auditory and physiological behavioral cues along with any direct input data that may have been entered via an input device 207 into an IoT device 151.

Different types of content 603 may have different-sized engagement zones, which may vary based on the size, accessibility and viewability of the content 603 being displayed. For example, a 100 ft billboard displayed outdoors on the side of a highway may have a much larger engagement zone than a poster or advertisement physically displayed indoors or within a particular store. The large billboard may be visible from hundreds or thousands of feet away, by users 601 being transported along roads, highways, sidewalks, etc. and thus have an engagement zone established by the location module 127 accordingly. Conversely, an indoor advertisement being displayed within a particular store or location may only be visible from a few dozen feet away and therefore have a more limited engagement zone size.

Embodiments of the user tracking module 119 may further comprise an input module 129. The input module 129 may perform the task or function associated with translating inputs from one or more input devices 207 of an IoT device 151 into input data, input commands or program instructions. Examples of an input device 207 can include a keyboard, mouse, keypad, terminal, touch screen interfaces, buttons, switches, dials, etc. The manipulation of an input device 207 may generate input data which may be received and stored by the input module 129. A user 601 may interact with an input device 207 of an IoT device 151 to generate input data, which may be considered along with sensor data, video data, audio data and location data to determine whether or not the user 601 has been observed displaying an expression of interest in the displayed content 603.

The generation of input data via the input device 207 may be a direct means for a user 601 to signal an expression of interest in the content 603 being displayed. A user 601 entering the engagement zone surrounding the content 603 may generate input using the input device 207 connected to one or more IoT device 151, to signal interest in the content 603 (i.e. through a pre-configured key-press), by rating the content 603 observed, generating a positive or negative comment, providing a thumbs up or thumbs down, bookmarking the content 603, annotating the content 603 as being of interest, and/or messaging other individuals about the content 603 via email or a messaging service. For example, a user 601 may be travelling past an advertisement displayed along a road or highway. As the user 601 engages with the displayed content 603 of the advertisement, one or more IoT devices 151 built into the user's 601 vehicle, may allow for input to be entered via an input device 207, such as a touch screen interface as shown by the example in FIG. 6-7b. While the user 601 is engaged with the content 603 being displayed, the user 601 may enter a command, message, note or other type of input expressing interest in the content 603 being displayed or interacted with while driving the vehicle using the input devices 207. The input data generated by the input device 207 can be transmitted via network 150 to the input module 129, wherein the input data is stored, and characterized by the input module 129 and analyzed by the analytics module 135 for an expression of interest.

In some embodiments, an analytics module 135 may be integrated into the user tracking module 119. The analytics module 135 may perform the task or function of analyzing one or more types of data, including sensor data, video data, audio data, location data and input data generated by one or more IoT devices 151 and/or client devices 155, in order to draw one or more conclusions about a user's 601 expressed interest in content 603 being displayed in a public location as a function of one or more behavioral cues. For example, by training the analytics module 135 to recognize particular patterns in human behavior that indicate interest in the content 603 being viewed. For instance, training the analytics module 135 to conclude there is an interest based on a user's 601 length of time gazing or reading the content 603, positive or negative sentiment expressed visually via body language or gestures, positive or negative vocalized sentiment and/or direct inputs through input devices 207 or voice commands The analytics module 135 may draw insights and conclusions from the collected data to predict the user's 601 behavior using one or more predictive models and statistical algorithms to draw these conclusions. Predictive modeling may be a process that incorporates data mining and probability to forecast an outcome or conclusion (i.e. has the user 601 shown interest in the content 603). Each predictive model can comprise a plurality of predictions, which may be considered variables likely to influence future results. Once the different types of data are collected, a statistical model can be formulated. In some embodiments, the model may be a simple linear equation, while in alternative embodiments, the predictive model may be a complex, neural network. As the IoT devices 151 collect additional data about each user 601, the statistical analysis model of the analytics module 135 may be validated or revised according to the evidence provided by the collected data, improving the accuracy of the analytics module 135 to predict whether a user 601 is expressing interest in content 603 as a function of one or more behavioral cues in future analyses.

Embodiments of the IoT management platform 101 may further comprise a content repository 131. The content repository 131 may be responsible for performing the task of saving, storing, organizing and retrieving the files associated with the digital version 161 of the content 603, expanded content 163 and similar content 165. The content repository 131 may be a local repository that may be stored on a local computer system that may run as part of the IoT management platform 101 or in some embodiments, the content repository 131 may be accessible across the network 150. The content repository 131 may comprise one or more databases and/or files which may save and store copies of the digital version 161 of content 603, copies of expanded content 163 and/or similar content 165 having one or more distinguishing characteristics in common with the content 603 being viewed by the user 601. When a user is determined to be interested in the content 603, reporting engine 139 or another component of the IoT management platform 101 may request one or more files associated with the content 603 to be delivered to the IoT device 151 and/or client device 155, alone or combined as aggregated content.

In some instances, the content repository may not have directly stored one or more files of the aggregated content being requested by the reporting engine 139. Under this circumstance, a content repository or the reporting engine 139 may seek out the one or more files of the aggregated content from one or more data sources 160 which may be storing the digital version 161 of the content 603, expanded content 163 related to the content 603 and/or similar content 165. The IoT management platform 101 may request the retrieval of files that may not be currently stored by the content repository 131, receive the files from one or more data sources 160 and store the retrieved files to the content repository 131.

Embodiments of the user tracking module 119 may further comprise a user database 133. The user database 133 may perform the task or function of saving, storing and organizing information about each user 601 or content owner that may access and/or use the IoT management platform 101. Embodiments of the user database 133 may track historical user 601 data, including histories of behavioral patterns and behavioral cues that may indicate interest being expressed in content 601 being viewed by the user 601. Moreover, in some embodiments, the user database 133 may track the types of content 603 that a user as previously shown interest in and categorize a user's particular interests. The analytics module 135 may use the user preference described in the user database 133 in some embodiments to further influence the predictability of a user's behavior as being interested in the content being currently viewed by the user 601. For example, if the content currently being viewed by the user 601 is similar to or related to a category of previously viewed content 603 where the user 601 has expressed interest, the analytics module 135 may account for the increased interest and raise the probability that the current content 603 being viewed within a similar category is likely to pique the interest of the user 601 as well.

Embodiments of the user tracking module 119 may also comprise a reporting engine 139. The reporting engine 139 may perform the function or tasks of retrieving one or more files of aggregated content from the content repository 131 and/or data sources 160, delivering the aggregated content an IoT device 151 or client device 155 and/or updating the user database 133 to reflect a user's 601 interest in and receipt of the aggregated content. Embodiments of the reporting engine 139 may interface with the analytics module 135 to create and generate reports for users and administrators of the IoT management platform 101, including content 603 owners. The reports generated by the reporting engine 139 may provide useful information describing user interactions with content 603, the number of users 601 requesting aggregated content, which content locations receive the most requests based on interest of users 601, allowing for users and content owners accessing the IoT management platform 101 to assess the popularity and effectiveness of the advertisements and other forms of content 603 being viewed by users 601.

Method for Delivering Personalized, Aggregated Content

Figure 8A:
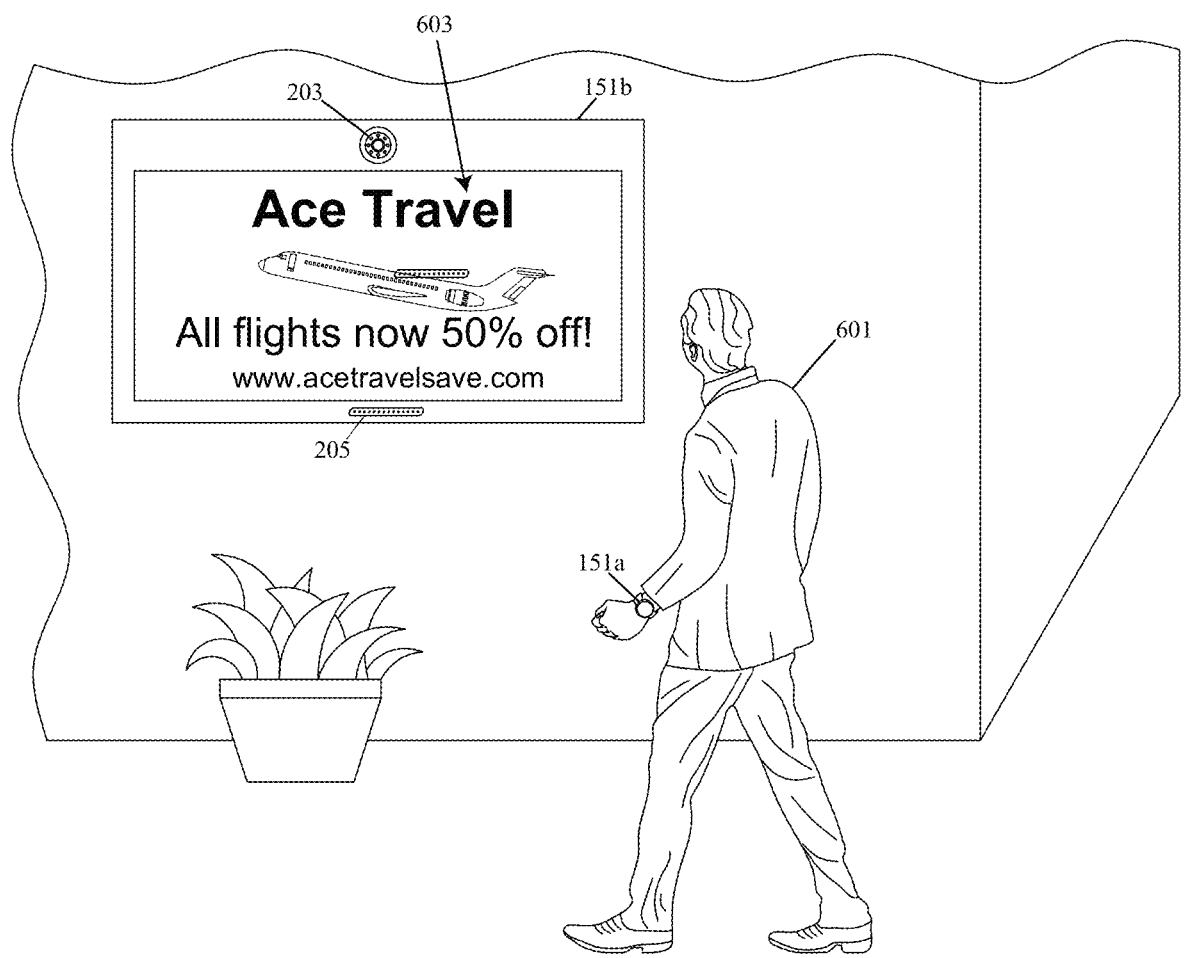
FIG. 8a illustrates an alternative embodiment for tracking a user expressing interest in displayed content, wherein the IoT device tracking user interest in the displayed content is the apparatus displaying the content.
Figure 8B:
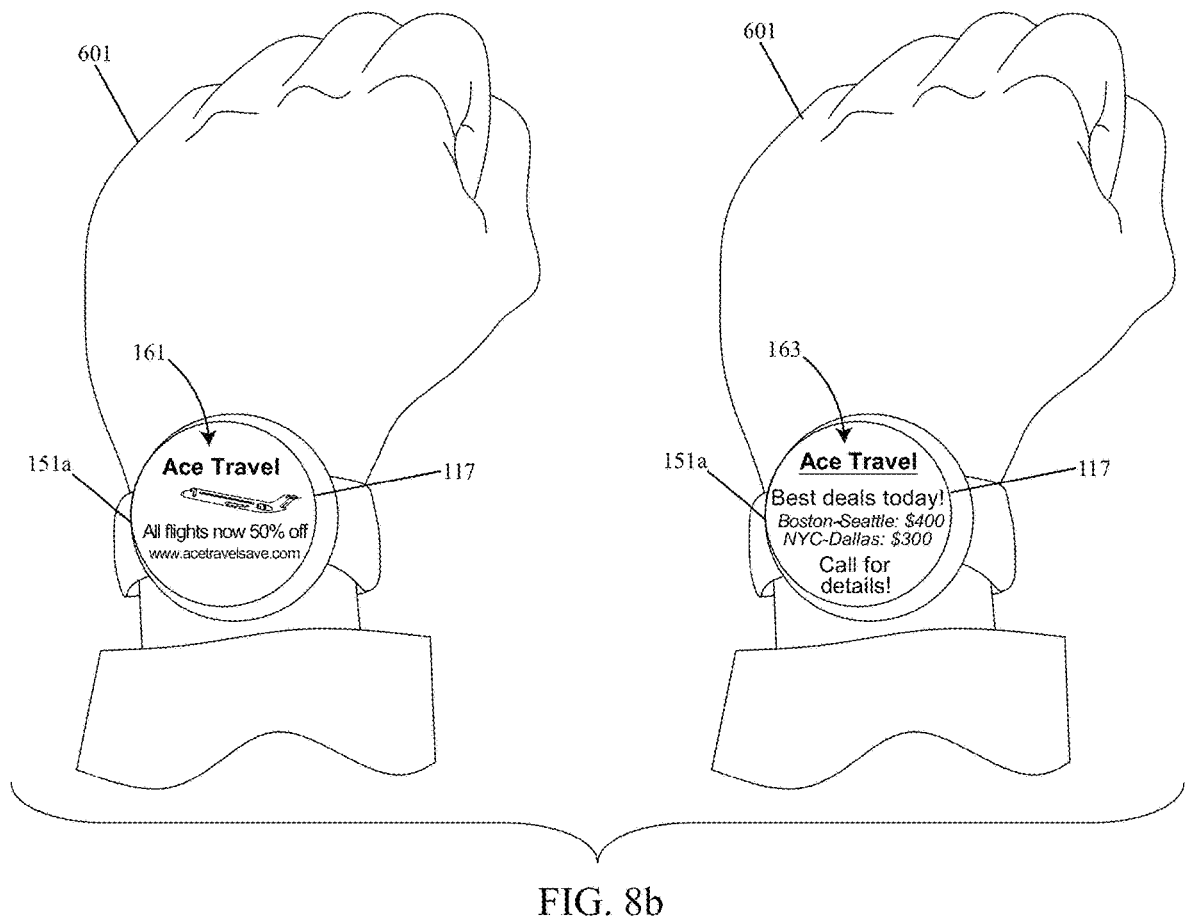
FIG. 8b illustrates the alternative embodiment of FIG. 8a, delivering aggregated content to an IoT device worn by the user.
Figure 8C:
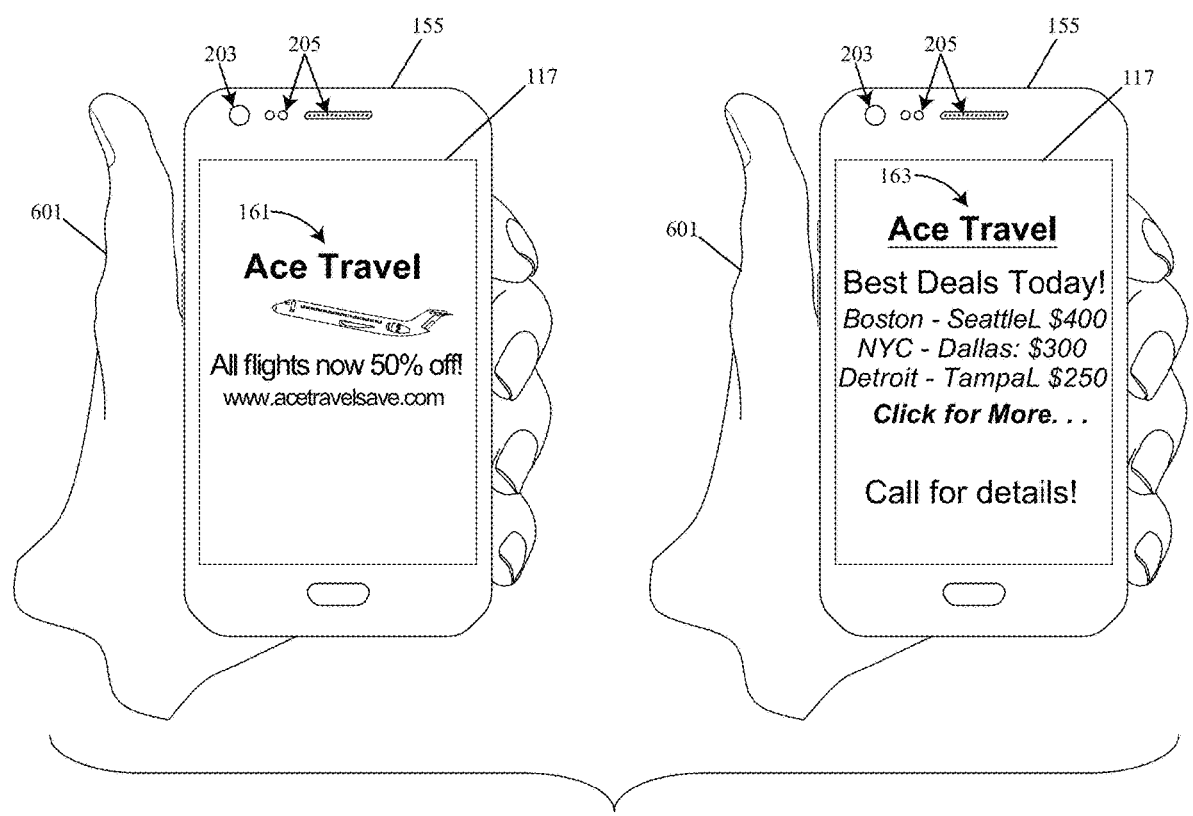
FIG. 8c illustrates the alternative embodiment of FIG. 8a, delivering aggregated content to a client device in possession of the user.
Figure 9A:
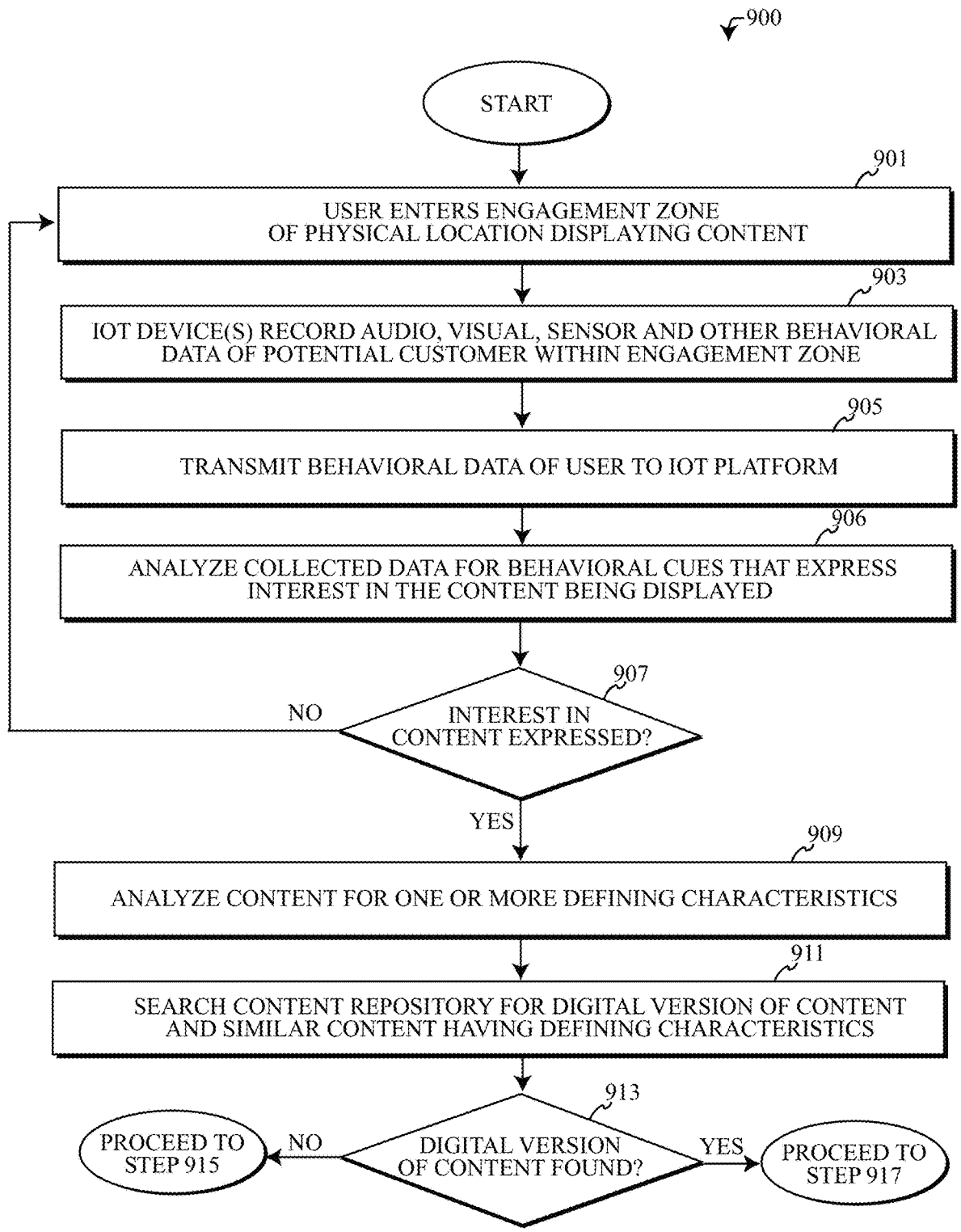
FIG. 9a is a flow diagram describing an embodiment of a computer implemented method in accordance with the present disclosure.
Figure 9B:
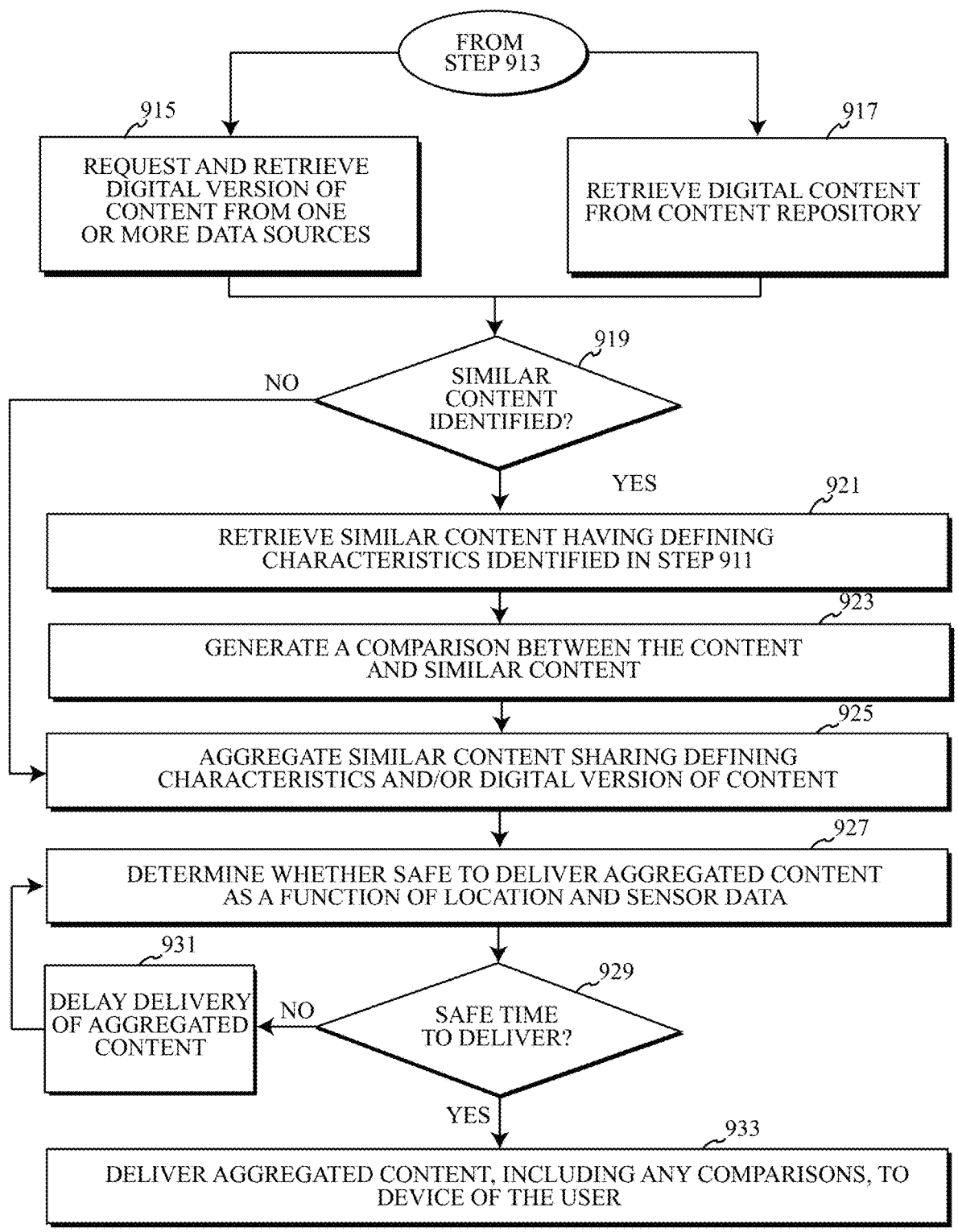
FIG. 9b is a continuation of the flow diagram of FIG. 9a, describing the embodiment of the computer implemented method in accordance with the present disclosure.

The drawings of FIG. 9a-9b represent embodiments of methods for tracking users 601 and delivering a digital version 161 of the content 603 along with additional aggregated content to the user 601 expressing interest in physically displayed content 603, as described in FIGS. 1-8c using one or more computer systems as defined generically by computer system 1000 of FIG. 10 below and more specifically by the embodiments of specialized computer systems, such as IoT management platform 101, IoT device 151 and client device 155 depicted in FIGS. 1-8c and as described herein. A person skilled in the art should recognize that the steps of the method described in FIGS. 9a-9b may be performed in a different order than presented and the methods of FIGS. 9a-9b may not require all the steps described herein to be performed. Rather, some embodiments may alter the methods by using one or more of the steps discussed below.

FIG. 9a represents a flowchart illustrating a first portion of a method 900 for tracking users 601 and delivering aggregated content in accordance with the embodiments of the present disclosure. The embodiment of the method 900 may begin at step 901. In step 901, a user 601 may enter an engagement zone displaying the content 603. The engagement zone may be a physical space or area from which the displayed content 603 may be viewable to the user 601 in some embodiments. In other embodiments, the engagement zone may be area that may detect the presence of a user 601 within a specified area or region surrounding the displayed content 603.

An example of this can be seen in FIG. 8a, wherein a user 601 is walking within viewing distance of an IoT device 151b displaying an advertisement. The IoT device 151b may detect the presence of the user in a variety of ways. For example, video system 203 can visibly observe and capture video data of the user 601 approaching the IoT device 151b, or audio data via audio system 205 to listen for users 601 approaching the engagement zone of the IoT device 151b. In alternative embodiments, an IoT device 151 worn by a user 601 or client device 155 may communicate with a separate IoT device 151 affixed to or monitoring the content 603. As shown in FIG. 8a, as the user 601 approaches IoT device 151b displaying content 603, an IoT device 151a worn by the user 601 or client device 155 may communicate via network 150 or through the IoT management platform 101 to inform the IoT device 151b of the user's nearby presence. In response to the communication between IoT devices 151a or client device 155 and 151b, the video system 203 and/or audio system 205 may be able to locate the user 601 and focus these systems 203, 205 on collecting data about the user's behavioral cues.

In step 903 of method 900, IoT devices 151 may record behavioral data using one or more data collection systems in order to identify one or more behavioral cues suggesting that a user 601 entering the engagement zone of the content 603 display is expressing interest in the content. The data collection systems may be connected to one or more IoT devices 151, and may include audio data, video data, sensor data, location data, and input data from one or more sensor devices 201, video systems 203, audio systems 205 and input devices 207. The behavioral data recorded by each of the data collection systems, may be collected and stored by the sensor engine 221, video engine 223, audio engine 225 and/or location services 227 in some embodiments. As shown in FIG. 6, a plurality of IoT devices 151 may work together recording data and recognizing behavioral cues. As shown in the example of FIG. 6, an IoT device 151n of an automobile is operating alongside wearable IoT device 151a in order to evaluate behavioral cues of the user 601 operating the automobile. IoT device 151 may be outfitted with a video system 203 as shown, collecting video data as the user 601 drives past content 603 positioned along the roadside. Video system 203 may collect video data tracking the user's attention, eye movements, gaze, body language, facial expressions, in order to determine whether or not the user is focused on the content 603 as the user 601 drives past and the user's 601 positive or negative reaction to the content 603. As the user 601 drives the vehicle through the engagement zone of the content 603, audio system 205 may be simultaneously collecting audio data, including vocal commands, comments about the content, and other statements having a positive or negative sentiment in conjunction with the visual expressions collected by the video system 203.

Moreover, as shown in FIG. 6, one or more input devices 207 may be integrated into the vehicle operating as IoT device 151n, wherein the user can directly input positive or negative behavioral cues into the IoT device 151n via input device 207, including requests for additional information about the content 603 the user drove past or viewed, comments, ratings, internet searches, etc. Furthermore, in addition to the collection systems of IoT device 151*n*, the user 601 may be wearing an IoT device 151*a* as shown in FIG. 6. IoT device 151*a*, may be separately collecting audio data, video data, sensor data, input data in addition to the data collections made by IoT device 151*n*. For example, the wearable IoT device 151*a* could be collecting physiological measurements of the user 601, including heart rate, blood pressure, oxygen levels, etc. as the user 601 drives the vehicle operating as IoT device 151*n* past the content 603 as shown.

In step 905 of method 900, each IoT device 151 may transmit the behavioral data collected in step 903 over the network 150 to the IoT management platform 101 for additional processing, storage and/or analysis. In some embodiments, the behavioral data may be sent from the sensor engine 221 to the sensor module 121; video engine 223 to video module 123; audio engine 225 to audio module 125; and from the location service 227 to the location module 127 of the IoT management platform 101. The behavioral data received from the IoT devices 151 may be saved, stored, organized and formatted into one or more sets of structured data by the user tracking module 119 and/or one or more sub-modules receiving the behavioral data. For example, inputting each piece of behavioral data into a database and completing one or more fields describing the behavioral data received, such as the type of data, date/time recorded, location of the recording, the IoT device 151 performing the recordation, identification of the content 603 being viewed, physical location of the content 603 and any preliminary description of the content of the behavioral data collected, such as a descriptor of the sentiment of the user 601.

In step 906 of method 900, the behavioral data collected in step 903 and transmitted to the IoT management platform 101 in step 905 may be analyzed by the IoT management platform 101 for behavioral cues that may indicate an expression of interest in the content 603 by the user viewing the content 603. Embodiments of the audio data, video data, sensor data, input data and location data may be analyzed by the analytics module 135, wherein one or more conclusions about the behavioral data may be drawn by the analytics module 135 using one or more data analytic techniques, including but not limited machine learning, data mining, deep learning, neural networks and other analytical techniques know by a person skilled in the art. In some embodiments, the audio data may be processed into free text and the language or words recorded in the audio data may be parsed by analyzing the audio data with a natural language processor 130. The NLP 130 may be part of the audio engine 225 of the IoT device 151, part of the audio module 125 of the user tracking module 119 and/or a separate module of the user tracking module shown as NLP 130 in FIG. 1. The processed audio and parsed text of the audio data may be sent to the analytics module 135 in step 906 for analysis as well.

In step 907, a determination may be made whether or not the user 601 has expressed an interest in the content 603 based on the behavioral cues evidenced by the behavioral data collected by one or more data collection systems of each IoT device 151 and the analysis of the behavioral data in step 906 of method 900. Accordingly, if a determination is concluded by the analytics module 135 that a user has not expressed interest in the content 603, no further action may be taken, and the algorithm may return to step 901, wherein the next user detected within the engagement zone of the displayed content 603 may be observed, analyzed and recorded to determine an expressed interest in the content 603. Conversely, if in step 907 the analytics module 135 draws a conclusion based on the behavioral data that a user has expressed interest in the displayed content 603, the method may proceed to step 909.

In step 909, the content 603 being viewed by the user may be analyzed for one or more defining characteristics that may be describe or categorize the type or kind of content 603 being observed by the user. In some embodiments, content owners may have registered the content 603 with the IoT management platform 101. When submitting the content 603 to the IoT management platform 101, the content owners may tag the content with metadata describing the content 603, including descriptions, keywords and metatags which may be used to classify the content within the content repository 131, as well as any expanded content 163 they may have been submitted alongside the digital version 161. In alternative embodiments, images of the content 603 may be recorded by one or more video systems 203 and analyzed for defining characteristics, including product or service names, content owner names, telephone numbers, addresses, etc. Embodiments of the IoT management platform 101 may search for one or more data sources 160 associated with the content 603 and tag the content 603 with keywords, descriptions and tags in the content repository.

In step 911 of method 900, the IoT management platform 101 may search the content repository 131 for a digital version 161 of the content 603, as well as for expanded content 163 and similar content having one or more defining characteristics identified in step 909 of method 900 (for example, by comparing keywords, tags and descriptions for matching descriptions, themes, tags, content owners, industries, etc.). The method 900 may proceed to step 913, wherein the IoT management platform 101 determines whether or not a digital version 161 of the content 603 has been found in the content repository 131. If a digital version 161 has not been found, the method 900 may proceed to step 915, otherwise, the method may proceed to step 917.

In step 915, a request may be made to retrieve a digital version 161 of the content 603 from one or more data sources 160 accessible to the IoT management platform 101 via network 150 and storing the digital version 161. The digital version 161 may be retrieved from the data source 160 and stored in the content repository 131 of the IoT management platform 101 and loaded by the reporting engine 139. Similarly, in step 917, if the digital versions 161 of displayed content 603 was already stored by the content repository 131, the reporting engine 139 may retrieve digital versions 161 of the content 603 from the content repository 131 and load the digital versions 161 into the reporting engine 139.

In step 919, a determination may be made by the IoT management platform 101, whether or not expanded content 163 or similar content 165 is identified and available for retrieval from either a data source 160 or the content repository 131, for dissemination to a user's 601 device. If no expanded content 163 or similar content 165 is identified, the method 900 may proceed to step 925. Otherwise, if expanded content 163 or similar content 165 is identified, the method may proceed to step 921. In step 921, the reporting engine 139 of the IoT management platform 101 may retrieve the similar content 165 or expanded content 163 from the content repository 131 and/or one or more data sources 160. Moreover, in step 923, the reporting engine 139 and/or analytics module 135 may compare and contrast the similarities and differences between the digital version 161 of the content 603, expanded content 163 related to content 603 and/or the similar content 165 having one or more distinguishing characteristics in common with the content 603. The reporting engine 139 may generate a comparison chart, figure, graphic or other type of graphical representation or report describing the similarities and differences between each piece of aggregated content collected in steps 915, 917, and/or 921.

In step 925 of method 900, the reporting engine 139 may aggregate each digital version 161 of the content 603, expanded content 163 of content 603 and similar content 165 having one or more of the same distinguishing characteristics as content 603 into the reporting engine 139 in anticipation of delivery to the user's 601 IoT device 151 or client device 155. In some embodiments, method 900 may proceed to step 927 and determine whether or not it is a safe point in time to deliver the aggregated content to the user 601. The determination of a safe time or location may be evaluated based on one or more pieces of data collected by the sensor device 201, video system 203, audio system 205 and/or input device 207. For example, one or more sensor devices 201 could track the velocity of a vehicle, while the video system 203 may track the position of a user 601 within a vehicle and determine whether the user 601 is a driver or passenger. Embodiments of the IoT management platform 101 may be programmed with one or more rules that may prevent delivery of the aggregated content while a user 601 is driving a vehicle that is in motion, whereas is may be considered safe to deliver the aggregated content to a passenger of a vehicle that may still be traveling at a high rate of speed.

In step 929 a determination is made by the IoT management platform, whether or not conditions surrounding the user 601 are currently safe to deliver the aggregated content to the user 601. If, delivery of the aggregated content is considered unsafe at the current moment in time, the method 900 may proceed to step 931 and delay the delivery of the aggregated content for an appropriate time that is determined to be considered safe. Conversely, if in step 929, a determination is made that the current time is safe to deliver the aggregated content, the method may proceed to step 933, wherein the reporting engine 139 may deliver the aggregated content, including any comparisons between the digital version, expanded content 163 and similar content 165 to a device of the user 601, such as an IoT device 151 or client device 155.

FIG. 6-7b depicts an example of delaying the delivery of aggregated content to a user 601 operating a vehicle. As shown in FIG. 6, a user 601 views content along the side of the road while traveling in a vehicle being operated by the user 601. Even though the user 601 has expressed interest in viewing the content 603 along the side of the road, the content is not displayed on human-readable display 117 of the IoT device 151*n* during travel. As shown in FIG. 7a, the user 601 parks the vehicle (designated as IoT device 151*n*) in a parking space, wherein the vehicle may come to a complete stop. Subsequently, after parking the vehicle as shown in FIG. 7a, in FIG. 7b the digital version 161 of the content 603 previously viewed in FIG. 6 is delivered and displayed on the human-readable display 117 of IoT device 151*n* as shown.

Computer System

FIG. 10 is a block diagram of internal and external components of a computer system 1000, which may be representative of the one or more computer systems depicted in the computing environment 100, 300, 450 as shown in FIGS. 1-8c in accordance with the embodiments of the present disclosure. It should be appreciated that FIG. 10 provides only an illustration of one implementation and does not imply any limitations with regard to the environments in which different embodiments may be implemented. In general, the components illustrated in FIG. 10 are representative of any electronic device capable of executing machine-readable program instructions. Examples of computer systems, environments, and/or configurations that may be represented by the components illustrated in FIG. 10 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 1000 may include communications fabric 1002, which provides for communications between one or more processors 103, memory 105, persistent storage 106, communication unit 111, and one or more input/output (I/O) interfaces 113. Communications fabric 1002 can be implemented with any architecture designed for passing data and/or control information between processors 103 (such as microprocessors, communications and network processors, etc.), memory 105, external devices 115, and any other hardware components within a system. For example, communications fabric 1002 can be implemented with one or more buses.

Memory 105 and persistent storage 106 may be computer-readable storage media. Embodiments of memory 105 may include random access memory (RAM) 107 and cache 109 memory. In general, memory 105 can include any suitable volatile or non-volatile computer-readable storage media. Software, such as a program 1021 may be stored in persistent storage 106 for execution and/or access by one or more of the respective processors 103 via one or more devices of memory 105.

Persistent storage 106 may include, for example, a plurality of magnetic hard disk drives. Alternatively, or in addition to magnetic hard disk drives, persistent storage 106 can include one or more solid state hard drives, semiconductor storage devices, read-only memories (ROM), erasable programmable read-only memories (EPROM), flash memories, or any other computer-readable storage media that is capable of storing program instructions or digital information. Embodiments of the media used by persistent storage 106 can also be removable. For example, a removable hard drive can be used for persistent storage 106. Other examples include optical and magnetic disks, thumb drives, and smart cards that are inserted into a drive for transfer onto another computer-readable storage medium that is also part of persistent storage 106.

Communication unit 111 provides for communications with other computer systems or devices via a network (e.g., network 150). In the exemplary embodiment, communication unit 111 may include network adapters or interfaces such as a TCP/IP adapter cards, wireless Wi-Fi interface cards, 3G, 4G, or 5G wireless interface cards or other wired or wireless communication links. The network 150 can comprise, for example, copper wires, optical fibers, wireless transmission, routers, firewalls, switches, gateway computers and/or edge servers. Software and data used to practice embodiments of the present invention can be downloaded to each of the computer systems operating in computing environment 100, 300, 450 or computer system 1000 through communication unit 111 (e.g., via the Internet, a local area network or other wide area network). From communication unit 111, the software and data can be loaded onto persistent storage 106.

One or more I/O interfaces 113 may allow for input and output of data with other devices that may be connected to computer system 1000. For example, I/O interface 113 can provide a connection to one or more external devices 115 such as one or more IoT devices 151, audio systems 205, video systems 203, one or more sensor devices 201, input devices 207 such as a keyboard, computer mouse, touch screen, virtual keyboard, touch pad, pointing device, or other human interface devices. External devices 115 can also include portable computer-readable storage media such as, for example, thumb drives, portable optical or magnetic disks, and memory cards. I/O interface 113 may also connect to human-readable display 117. Human-readable display 117 provides a mechanism to display data to a user and can be, for example, a computer monitor or screen. Human-readable display 117 can also be an incorporated display and may function as a touch screen, such as a built-in display of a tablet computer.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising the steps of:
   detecting a user entering an engagement zone of a physical location displaying content;
   recording behavioral data of the user while present within the engagement zone of the physical location displaying the content, including sensor data from a sensor device measuring physiological changes of one or more vitals of the user, and audio data;
   analyzing the sensor data measuring physiological changes of the one or more vitals of the user and the audio data for behavioral cues expressing interest by the user in the content displayed at the physical location, wherein analysis of the audio data includes analysis for positive or negative sentiment of the content;
   determining, as a function of the behavioral data, that the user is expressing interest in the content;
   searching for a digital version of the content displayed at the physical location;
   delivering the digital version of the content displayed at the physical location to a client device operated by the user
   further analyzing the content displayed at the physical location for one or more distinguishing characteristics;
   identifying similar content matching the one or more distinguishing characteristics, said similar content comprising a competing product or service of the content displayed at the physical location;
   generating a report comparing and contrasting the content and the similar content; and
   delivering the similar content and the report alongside the digital version of the content to the client device.

2. The method of claim 1, wherein the step of recording behavioral data is performed by an internet of things (IoT) device positioned within the engagement zone.

3. The method of claim 1, wherein the behavioral cues include voice inputs recording comments of the user expressing the positive sentiment about the content.

4. The method of claim 1 further comprising the steps of:
   collecting location data, sensor data, or a combination thereof from the client device;
   determining, as a function of the location data, the sensor data or combination thereof, whether the user is currently travelling; and
   delaying the step of delivering the digital version of the content displayed at the physical location until the user has stopped travelling.

5. The method of claim 2, wherein the IoT device is a wearable device making physical contact with a body of the user.

6. The method of claim 2, wherein the IoT device is a physically displayed advertisement tracking the user entering the engagement zone and the detecting step is performed by communicating location information from the client device operated by the user to the physically displayed advertisement.

7. A computer system comprising:
   a processor;
   an internet of things (IoT) device placed in communication with the processor, wherein said IoT device includes an audio system, video system, sensor device or a combination thereof; and
   a computer-readable storage media coupled to a processor, wherein the computer readable storage media contains program instructions executing a computer-implemented method comprising the steps of:
   detecting a user entering an engagement zone of a physical location displaying content;
   recording behavioral data of the user while present within the engagement zone of the physical location displaying the content via the IoT device, including sensor data from the IoT device measuring physiological changes of one or more vitals of the user, and audio data;
   analyzing the sensor data measuring physiological changes of the one or more vitals of the user and the audio data for behavioral cues expressing interest by the user in the content displayed at the physical location, wherein analysis of the audio data includes analysis for positive or negative sentiment of the content;
   determining, as a function of the behavioral data, that the user is expressing interest in the content;
   automatically searching for a digital version of the content displayed at the physical location;
   delivering the digital version of the content displayed at the physical location to a client device operated by the user
   further analyzing the content displayed at the physical location for one or more distinguishing characteristics;
   identifying similar content matching the one or more distinguishing characteristics, said similar content comprising a competing product or service of the content displayed at the physical location;
   generating a report comparing and contrasting the content and the similar content; and
   delivering the similar content and the report alongside the digital version of the content to the client device.

8. The computer system of claim 7, wherein the behavioral cues include voice inputs recording comments of the user expressing the positive sentiment about the content.

9. The computer system of claim 7, further comprising the steps of:

collecting location data, sensor data, or a combination thereof from the client device;

determining, as a function of the location data, the sensor data or combination thereof, whether the user is currently travelling; and delaying the step of delivering the digital version of the content displayed at the physical location until the user has stopped travelling.

10. The computer system of claim 7, wherein the IoT device is a wearable device sensor device making physical contact with a body of the user.

11. The computer system of claim 7, wherein the IoT device is a physically displayed advertisement tracking the user entering the engagement zone and the detecting step is performed by communicating location information from the client device operated by the user to the physically displayed advertisement.

12. A computer program product comprising:

one or more computer readable storage media having computer-readable program instructions stored on the one or more computer readable storage media, said program instructions executes a computer-implemented method comprising the steps of:

detecting a user entering an engagement zone of a physical location displaying content;

recording behavioral data of the user while present within the engagement zone of the physical location displaying the content, including sensor data from a sensor device measuring physiological changes of one or more vitals of the user, and audio data;

analyzing the sensor data measuring physiological changes of the one or more vitals of the user and the audio data for behavioral cues expressing interest by the user in the content displayed at the physical location, wherein analysis of the audio data includes analysis for positive or negative sentiment of the content;

determining, as a function of the behavioral data, that the user is expressing interest in the content;

automatically searching for a digital version of the content displayed at the physical location;

delivering the digital version of the content displayed at the physical location to a client device operated by the user further analyzing the content displayed at the physical location for one or more distinguishing characteristics;

identifying similar content matching the one or more distinguishing characteristics, said similar content comprising a competing product or service of the content displayed at the physical location;

generating a report comparing and contrasting between the content and the similar content; and delivering the similar content and the report alongside the digital version of the content to the client device.

13. The computer program product of claim 12, wherein the step of recording behavioral data is performed by an internet of things (IoT) device positioned within the engagement zone.

14. The computer program product of claim 12, wherein the behavioral cues include voice inputs recording comments of the user expressing the positive sentiment about the content.

15. The computer program product of claim 12 further comprising the steps of:

collecting location data, sensor data, or a combination thereof from the client device;

determining, as a function of the location data, the sensor data or combination thereof, whether the user is currently travelling; and delaying the step of delivering the digital version of the content displayed at the physical location until the user has stopped travelling.

16. The computer program product of claim 13, wherein the IoT device is a wearable device making physical contact with a body of the user.

17. The computer program product of claim 13, wherein the IoT device is a physically displayed advertisement tracking the user entering the engagement zone and the detecting step is performed by communicating location information from the client device operated by the user to the physically displayed advertisement.

* * * * *